United States Patent [19]

Morohashi et al.

[11] Patent Number: 6,043,899
[45] Date of Patent: Mar. 28, 2000

[54] CODE PATTERN IMAGE RECORDING APPARATUS

[75] Inventors: Daikichi Morohashi; Hiroshi Sasaki, both of Hachioji; Mutsumi Kikuchi, Akishima, all of Japan

[73] Assignee: Olympus Optical Co., Ltd., Tokyo, Japan

[21] Appl. No.: 09/042,923

[22] Filed: Mar. 17, 1998

[30] Foreign Application Priority Data

Mar. 24, 1997 [JP] Japan ..................................... 9-087263
Feb. 16, 1998 [JP] Japan ................................... 10-032592

[51] Int. Cl.[7] .................................................. G06K 15/00
[52] U.S. Cl. ......................................... 358/1.18; 358/1.16
[58] Field of Search ........................... 358/1.1, 1.2, 1.16, 358/1.17, 1.18, 404, 444, 261.4, 449; 399/1, 2, 82, 83, 160, 376; 345/118, 507; 707/515, 520

[56] References Cited

U.S. PATENT DOCUMENTS 4,757,348  7/1988  Rouke et al. ............................... 355/6
5,025,397  6/1991  Suzuki ..................................... 364/519

FOREIGN PATENT DOCUMENTS

0670555 A1  9/1995  European Pat. Off. .
5-48187     7/1993  Japan .
8-106517    4/1996  Japan .

OTHER PUBLICATIONS

X—English language Abstract corresponding to 5–48187.
*English language Abstract only.

Primary Examiner—Arthur G. Evans
Attorney, Agent, or Firm—Frishauf, Holtz, Goodman, Langer & Chick, P.C.

[57] ABSTRACT

A code pattern image recording apparatus which allows easy layout and edit processes of a recorded code pattern image on another sheet surface without being limited by the size and the like of that sheet surface, includes a built-in microphone for inputting audio information, a code pattern image encode unit for converting the audio information into a code pattern image according to a predetermined format by processing the input audio information, a print head for continuously and optically readably printing and recording the converted code pattern image on a print medium, which is sequentially fed in a predetermined direction, along the feed direction, and a system controller for controlling to divisionally record the code pattern image by inserting non-recording regions in units of predetermined print recording lengths of the continuously recorded code pattern image along the feed direction of the print medium.

32 Claims, 18 Drawing Sheets

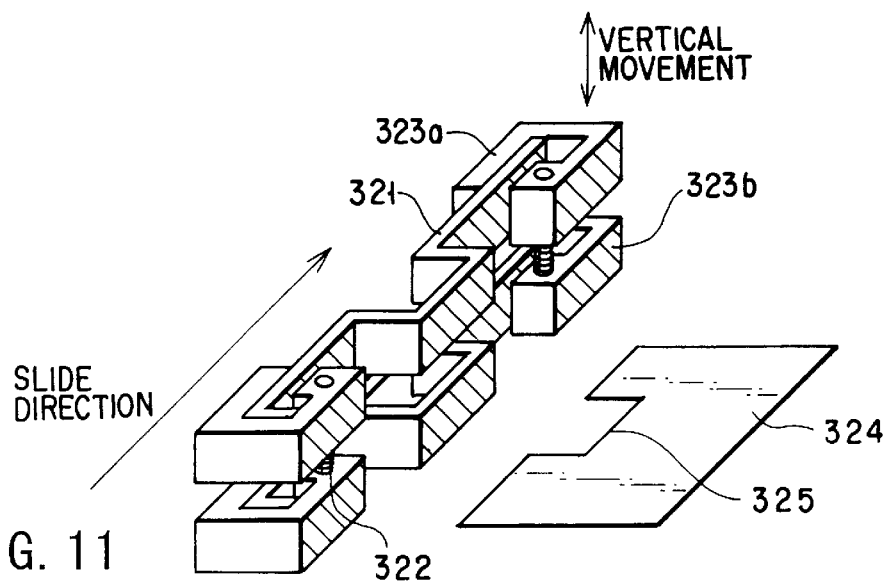
FIG. 11
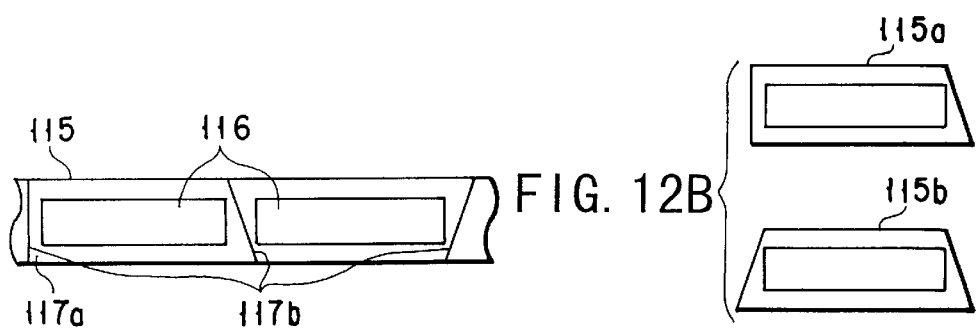
FIG. 12A
FIG. 12B
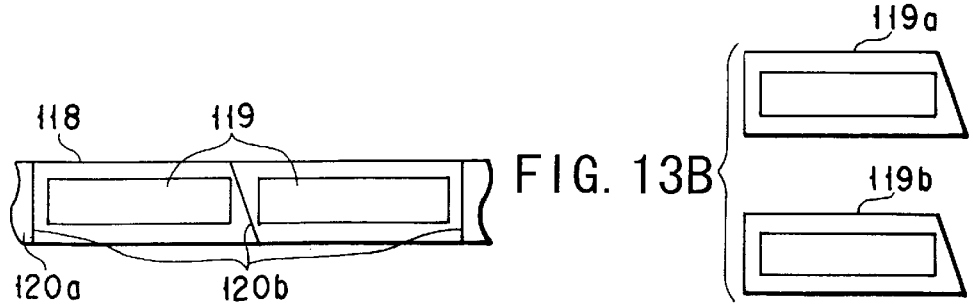
FIG. 13A
FIG. 13B
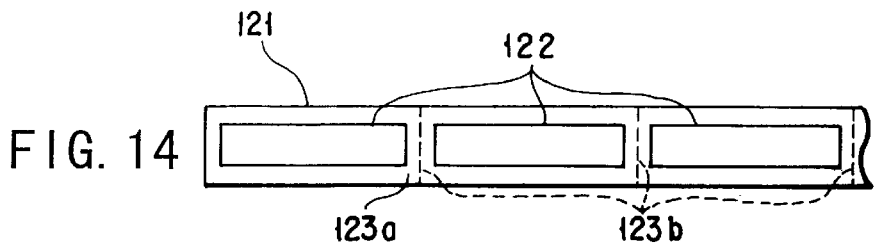
FIG. 14

FIG. 16A

| n/l | 1 | 2 | 3 | 4 |
|---|---|---|---|---|
| 1 | 1 | 2 | 3 | 4 |
| 2 | 5 | 6 | 7 | 8 |
| 3 | 9 | 10 | 11 | 12 |
| 4 | 13 | 14 | 15 | 16 |

HIGH MEDIUM USE EFFICIENCY ←→ HIGH STABILITY

SMALL TAPE WIDTH ↕ LARGE TAPE WIDTH

ELEMENT NUMBER (k) TABLE

| DETECTED VOLTAGE VALUE Vt [V] | MAXIMUM NUMBER (n) OF BLOCKS IN WIDTHWISE DIRECTION |
|---|---|
| Vt ≧ 3.0 | 4 |
| 3.0 > Vt ≧ 2.0 | 3 |
| 2.0 > Vt ≧ 1.0 | 2 |
| 1.0 > Vt | 1 |
F I G. 17
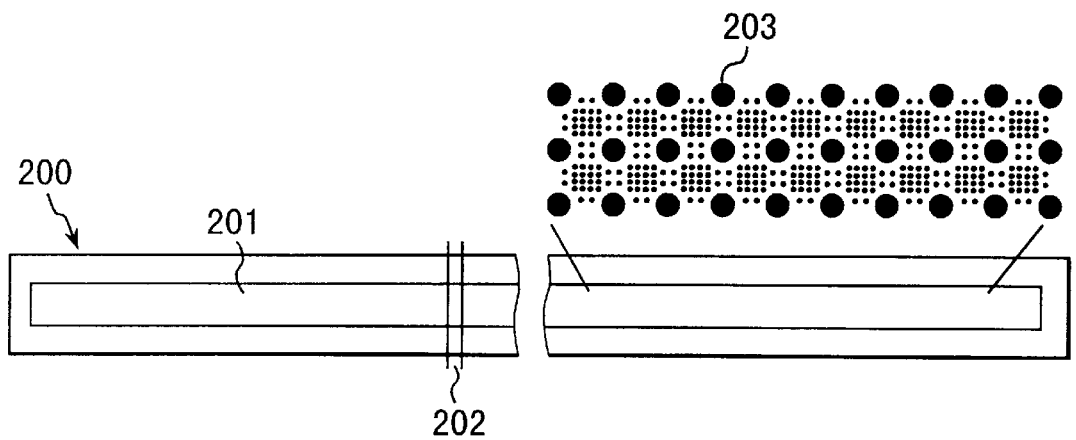
F I G. 25

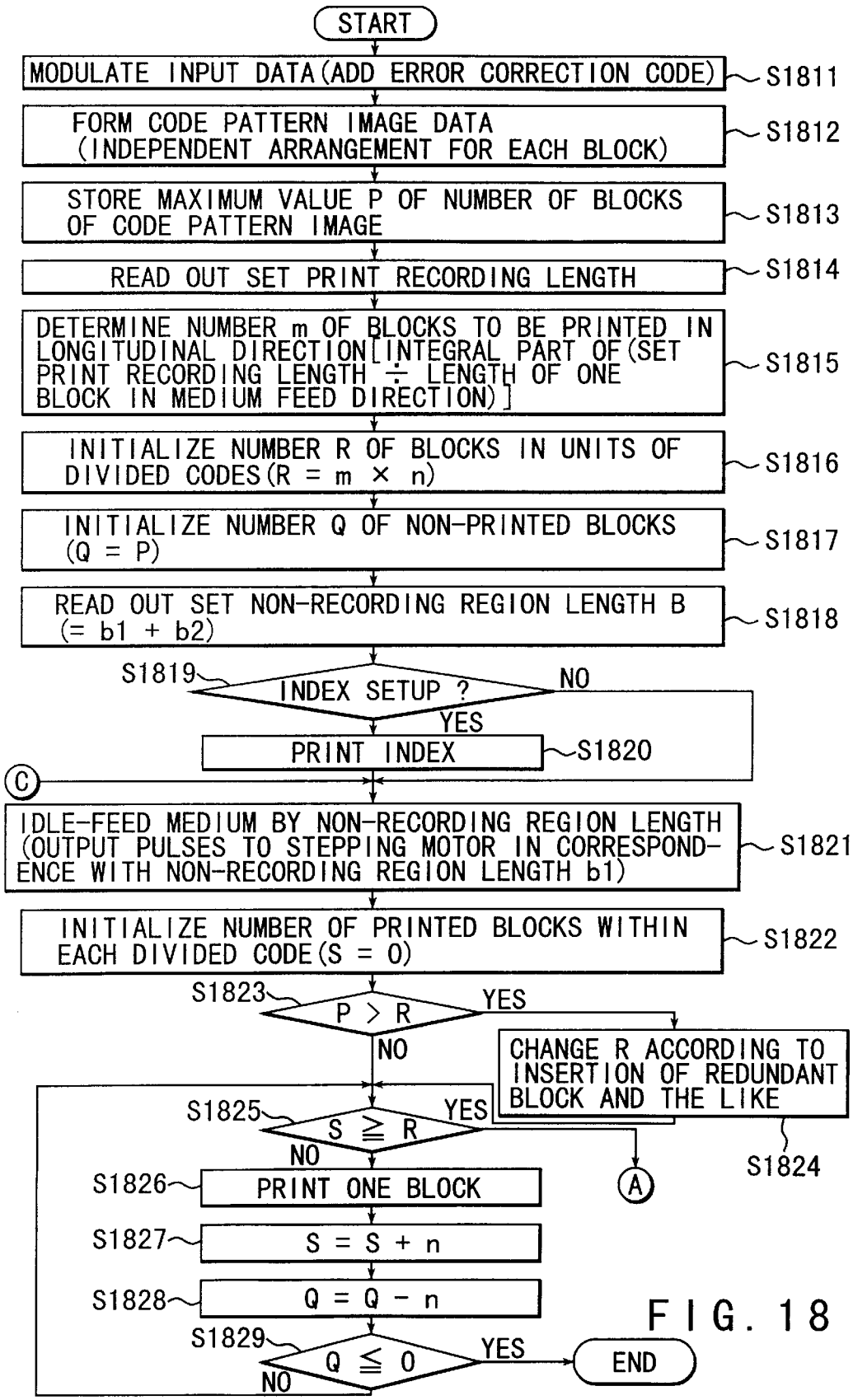
F I G. 18

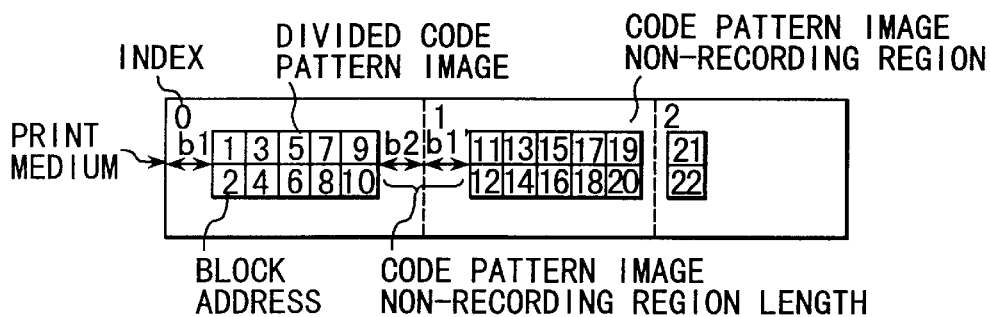
F I G. 20A
$$\begin{cases} \text{MAXIMUM VALUE P : 22} \\ \text{SET PRINT RECORDING LENGTH : 5cm} \\ \text{UNIT BLOCK LENGTH : 1cm} \\ \text{UNIT NUMBER m OF BLOCKS : 5} \\ \text{NUMBER n OF BLOCKS IN WIDTHWISE DIRECTION : 2} \\ \text{NUMBER R OF BLOCKS IN UNITS OF DIVIDED CODES : 10} \\ \text{SET NON-RECORDING REGION LENGTH B : 2cm} \\ \text{(FOR b1 = b2 = 1cm)} \end{cases}$$
F I G. 20B
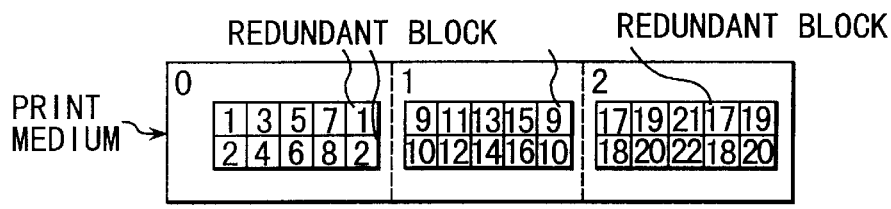
F I G. 20C
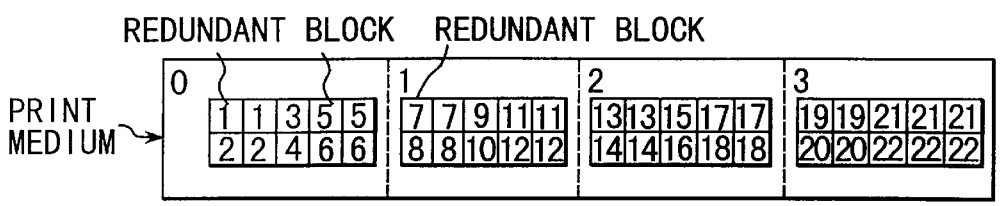
F I G. 20D
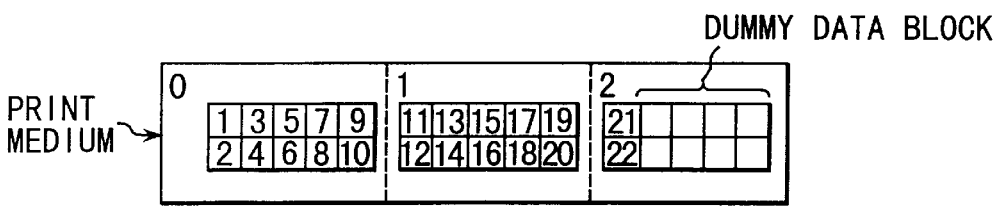
F I G. 20E

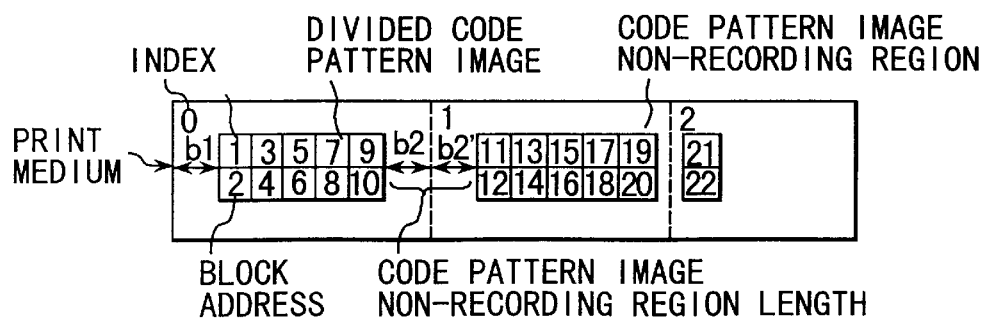
F I G. 21 A
$$\begin{cases} \text{MAXIMUM VALUE P : 22} \\ \text{SET PRINT RECORDING LENGTH : 5cm} \\ \text{UNIT BLOCK LENGTH : 1cm} \\ \text{UNIT NUMBER m OF BLOCKS : 5} \\ \text{NUMBER n OF BLOCKS IN WIDTHWISE DIRECTION : 2} \\ \text{NUMBER R OF BLOCKS IN UNITS OF DIVIDED CODES : 10} \\ \text{SET NON-RECORDING REGION LENGTH B : 2cm} \\ \text{(FOR b1 = b2 = 1cm)} \end{cases}$$
F I G. 21 B
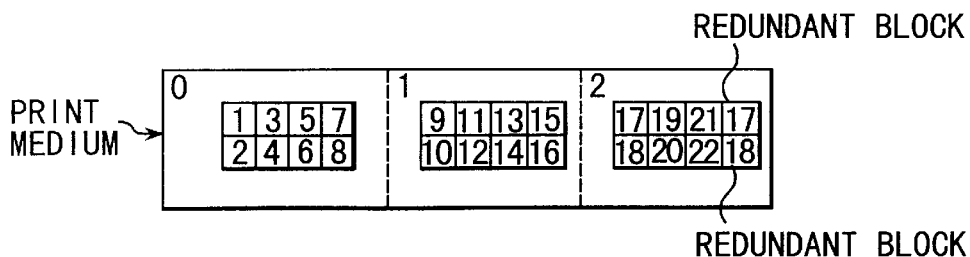
F I G. 21 C

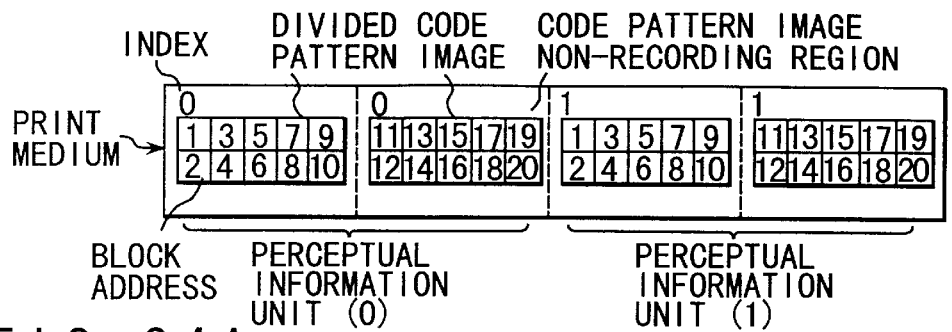
F I G. 24A
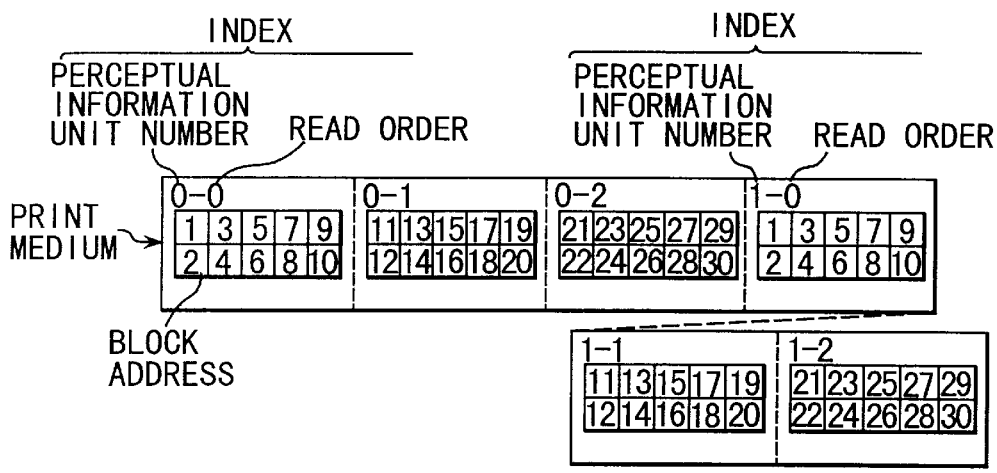
F I G. 24B
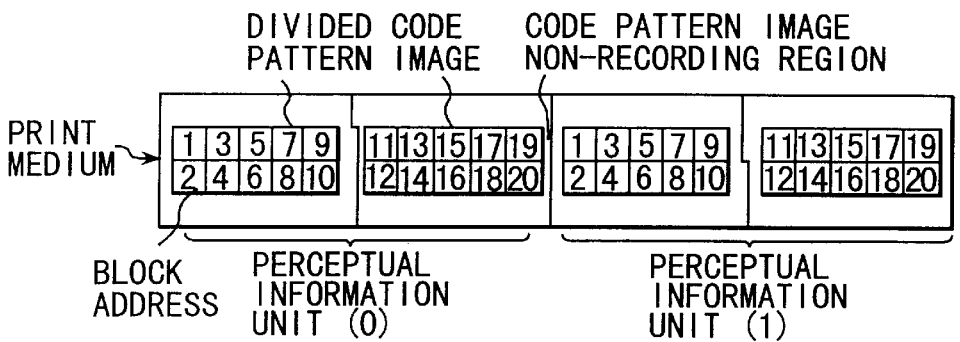
F I G. 24C
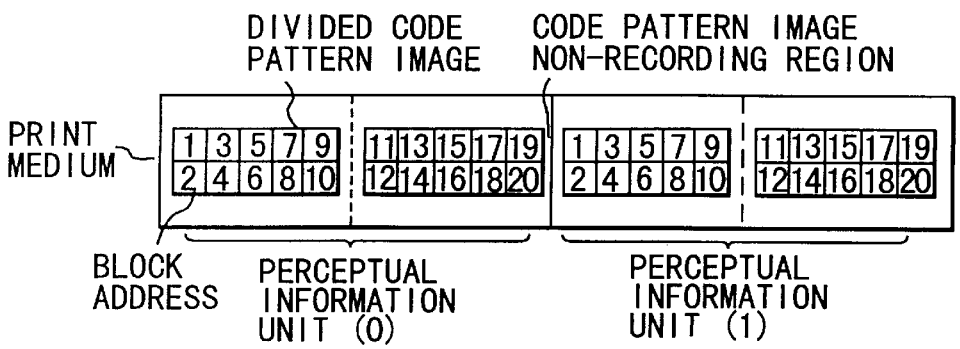
F I G. 24D

CODE PATTERN IMAGE RECORDING APPARATUS

BACKGROUND OF THE INVENTION

The present invention relates to a code pattern image recording apparatus for recording at least one information of audio information, video information, and digital code data used in, e.g., a computer as an optically readable code pattern image.

Furthermore, the present invention relates to a code pattern image recording apparatus which comprises a recording means for recording a code pattern image which allows easy layout and edit of a code pattern image on, e.g., a sheet surface, by continuously printing it on a print medium which is sequentially fed in a predetermined direction, along the feed direction and, more particularly, to a code pattern image recording apparatus, which allows the user to desirably determine the balance between the reading stability of the code pattern image and recording medium use efficiency.

Conventionally, for example, a code pattern image recording apparatus disclosed in EPO 670555A1 (corresponding to U.S. Ser. No. 08/407,018) prints input information as a series of code pattern images. More specifically, as shown in FIG. 25, this technique converts so-called multimedia information into a code pattern image 203, and continuously prints the entire code pattern image 203 on a print medium 200 without dividing it. In FIG. 25, reference numeral 201 denotes that continuously printed code pattern image.

Jpn. Pat. Appln. KOKAI Publication No. 8-106517 discloses a technique having a feature in code layout and reading stability. Such technique is useful when the print region is sufficiently broad with respect to the width or length of the code pattern image.

However, with the technique disclosed in EPO 670555A1 (corresponding to U.S. Ser. No. 08/407,018), when the information volume to be recorded becomes large, the length of the continuously printed code pattern image 201 falls outside the layout range on a sheet surface used in final layout. When the user divides the code pattern image using, e.g., scissors not to make it extend outside the sheet surface, it is very hard or impossible practically for him or her to cut it without destroying the minimum unit of the continuously printed code pattern image 201. In addition, since the print medium 200 itself becomes long, it is inconvenient to store, and if the print medium 200 is stored while being folded up, that fold may readily produce reading errors upon reproduction.

The techniques disclosed in the above two references do not have any disclosures about operations to be done when the recordable width of the code pattern image changes on, e.g., a tape-like recording medium or the like. That is, the code pattern image layout is designated by only the user or is the permanent one inherent to the system.

As described above, the conventional code pattern image recording apparatus, i.e., the code pattern image recording apparatus comprising the recording means for recording a code pattern image by continuously printing it on a print medium, which is sequentially fed in a predetermined direction, along the feed direction, prints a code pattern image to be printed on the print medium by only an input information volume as a code pattern image sequence, and has no means for detecting or designating the length of the print medium or the sheet surface in the print direction, on which the print medium is pasted and laid out.

For this reason, when the length of the print medium or the sheet surface in the print direction on which the print medium is pasted and laid out is smaller than that of a code pattern image sequence, the pattern falls outside the sheet surface, and cannot be effectively laid out on the sheet surface.

Furthermore, the conventional code pattern image recording apparatus does not consider printing on a plurality of print media having different printable ranges each of which can be printed by a single print job, and the print media that can be used are limited. In addition, the conventional apparatus cannot cope with a print medium with a small width. Hence, when a medium having a width smaller than the printable width of the print head is used in such conventional apparatus, a code pattern image is printed beyond the width of the medium, and cannot be partially printed.

Note that Jpn. Pat. Appln. KOKOKU Publication No. 5-48187 discloses a label printer in which a print image RAM that stores print data is divided into two or more areas in its longitudinal direction, and a feed space where no printing is done can be inserted between the divided RAM data to be printed, so that data can be reliably printed on pre-printed columns by adjusting the feed space. However, in this printer, the feed space is inserted not as a cut portion for dividing a single elongated code pattern image in units of predetermined sizes but for the purpose of adjusting the distance between adjacent data to be printed. Hence, this printer does not divisionally print single information using a plurality of barcodes.

BRIEF SUMMARY OF THE INVENTION

The present invention has been made in consideration of the above-mentioned problems, and has as its object to provide a recording apparatus, which allows layout even when the length of a print medium on which information has been recorded exceeds that of an object on which the print medium is to be laid out, and detects the width of the print medium used to cope with various types of medium widths.

In order to achieve the above object, a code pattern image recording apparatus according to the first aspect of the present invention, which comprises information input means for inputting at least one of audio information, video information, and digital code data, code pattern image conversion means for converting the information input by the information input means into a code pattern image according to a predetermined format, and recording means for continuously and optically readably printing and recording the code pattern image converted by the code pattern image conversion means on a print medium, which is sequentially fed in a predetermined direction, along the feed direction, is characterized by further comprising non-recording region insertion means for inserting a code pattern image non-recording region in units of predetermined print recording lengths of the continuously recorded code pattern image along the feed direction of the print medium, with the code pattern image being printed and recorded while being divided into a plurality of code pattern image portions, and in that the information input by the information input means is divisionally included in the divisionally recorded code pattern image portions.

A code pattern image recording apparatus according to the second aspect of the present invention, which comprises information input means for inputting at least one of audio information, video information, and digital code data, code pattern image conversion means for converting the information input by the information input means into a code pattern image according to a predetermined format, and recording means for continuously and optically readably printing and recording the code pattern image converted by the code pattern image conversion means on a print medium, which is sequentially fed in a predetermined direction, along the feed direction, is characterized by further comprising width information detection means for detecting information pertaining to a length of the print medium used in a widthwise direction perpendicular to the feed direction, and code pattern image setting means for setting an arrangement of the code pattern image to be recorded on the basis of the information detected by the width information detection means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 11 is a perspective view showing an example of a mechanism of cutting and dividing the print medium of FIG. 10;

FIGS. 12A and 12B show the arrangement of a print medium by a code pattern image recording apparatus according to the fifth embodiment;

FIGS. 13A and 13B are views for explaining the effect of the print medium by the code pattern image recording apparatus of the fifth embodiment;

FIG. 14 shows the arrangement of a print medium by a code pattern image recording apparatus according to the sixth embodiment;

FIG. 16A shows the format of a print medium by a code pattern image recording apparatus according to the eighth embodiment of the present invention;

FIG. 16B shows a reference layout;

FIG. 16C shows a layout used when the number of blocks is four times that in FIG. 16B, and the recorded data volume is equal to that in FIG. 16B;

FIG. 16D shows a layout used when the number of blocks is four times that in FIG. 16B, and the recorded data volume is twice that in FIG. 16B;

FIG. 16E shows a layout used when the number of blocks is 16 times that in FIG. 16B, and the recorded data volume is twice that in FIG. 16B;

FIG. 17 is a table showing the relationship between the voltage value upon detecting the print medium width and the maximum number (n) of blocks;

FIG. 18 is a flow chart showing another processing of the flow chart shown in FIG. 5;

FIG. 20A shows an example of a print medium formed by the processing shown in FIGS. 18 and 19, i.e., an example wherein no redundant blocks are inserted and a non-recording region alone is inserted;

FIG. 20B shows the insertion conditions of the non-recording region;

FIG. 20C shows an example of a print medium formed by the processing shown in FIGS. 18 and 19, i.e., an example wherein redundant blocks are inserted;

FIG. 20D shows an example of a print medium formed by the processing shown in FIGS. 18 and 19, i.e., an example wherein more redundant blocks than in FIG. 20C are inserted;

FIG. 20E shows an example of a print medium formed by the processing shown in FIGS. 18 and 19, i.e., an example wherein dummy blocks are inserted;

FIG. 21A shows an example of a mechanism of adjusting the print recording length according to the present invention, i.e., an example wherein a non-recording region alone is inserted;

FIG. 21B shows the insertion conditions of the non-recording region alone;

FIG. 21C shows the print medium when an integer value m'=4;

FIG. 24A shows a recording medium on which an index, cutting pattern, and the like are changed in correspondence with perceptual information units, i.e., an example wherein the index is changed in correspondence with the perceptual information units;

FIG. 24B shows a recording medium on which an index, cutting pattern, and the like are changed in correspondence with perceptual information units, i.e., an example wherein the index is changed in correspondence with the perceptual information units;

FIG. 24C shows a recording medium on which an index, cutting pattern, and the like are changed in correspondence with perceptual information units, i.e., an example wherein the cutting pattern is changed in correspondence with the perceptual information units;

FIG. 24D shows a recording medium on which an index, cutting pattern, and the like are changed in correspondence with perceptual information units, i.e., an example wherein the perforation formation pattern is changed in correspondence with the perceptual information units; and FIG. 25 is a view for explaining a conventional print medium and code pattern image.

DETAILED DESCRIPTION OF THE INVENTION

The preferred embodiments of the present invention will be explained hereinafter with reference to the accompanying drawings.

Figure 1:
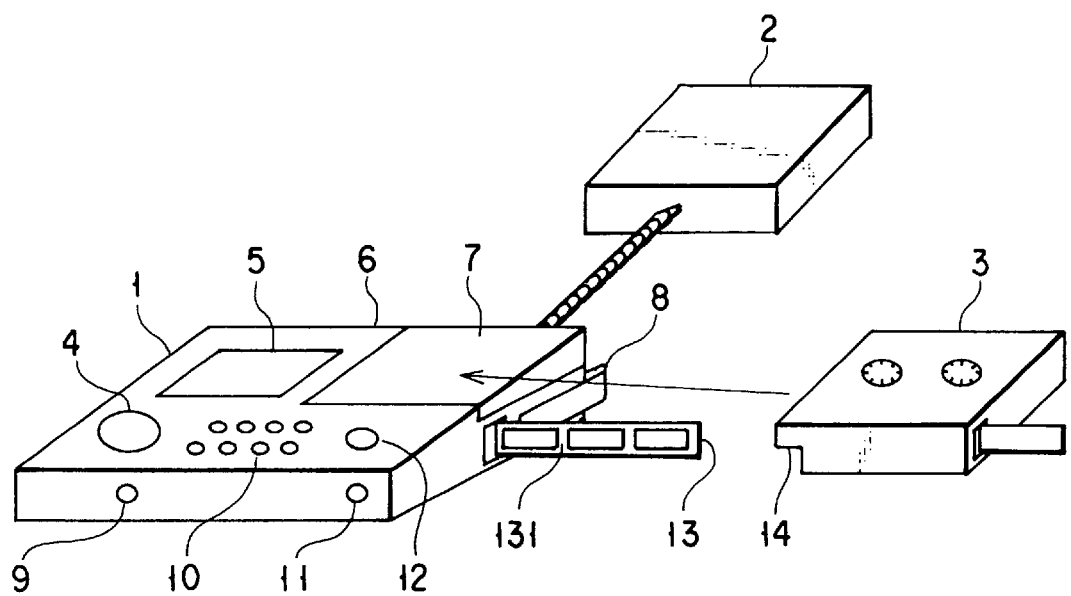
FIG. 1 is a perspective view showing the outer appearance of a code pattern image recording apparatus according to the present invention.

FIG. 1 shows the outer appearance of a code pattern image recording apparatus according to the present invention. The code pattern image recording apparatus converts input audio information into a code pattern image, and prints and records the code pattern image on a tape-like print medium.

Furthermore, upon printing, the apparatus inserts a code pattern image non-recording region in units of predetermined print recording lengths along the feed direction of the code pattern image. Note that the input information is not limited to audio information, but may be video information, digital code data including text data used in, e.g., a computer, and the like.

As shown in FIG. 1, a built-in loudspeaker 4 for outputting a voice, a display unit 5 for performing predetermined display, operation switches 10 for instructing various kinds of operations, a built-in microphone 12 for inputting a voice, an external loudspeaker terminal 9 for connecting an external loudspeaker, an external microphone terminal 11 for connecting an external microphone, and an external host personal computer (PC) interface (I/F) 6 for connecting an external PC are arranged at predetermined positions on the surface of a code pattern image recording apparatus 1. Furthermore, the code pattern image recording apparatus 1 has a storage portion 7 that stores a cartridge 3 of an ink ribbon and print medium, and a print medium cutter lever 8 for cutting a printed print medium 13 at a desired position. Moreover, the code pattern image recording apparatus 1 is connected to an AC adapter 2 for supplying electric power.

Various operations of the code pattern image recording apparatus with the above arrangement are as follows.

The operator inserts the cartridge 3 that stores an ink ribbon and tape-like print medium into the storage portion 7 of the apparatus of the present invention. The operator then turns on the apparatus and performs print setups using the operation switches 10 and display unit 5. The operator instructs voice recording using the operation switches 10, and talks into the built-in microphone 12 to record desired audio information. The operator instructs reproduction using the operation switches 10 to reproduce the previously recorded voice via the built-in loudspeaker 4, thus checking if the audio information is accurately recorded. After the operator confirmed that the audio information has been desirably recorded, he or she then instructs a print mode using the operation switches 10, so that the recording contents are printed on the print medium as a code pattern image. In response to this instruction, encoding for converting the recorded audio information into a code pattern image is done, and the converted code pattern image is then printed. When printing is complete and output of a print medium 13 has stopped, the operator operates the print medium cutter lever 8 to cut the medium 13 on which a code pattern image sequence is printed from that in the cartridge. In this manner, the operator obtains a print medium 13 on which desired audio information is printed as a code pattern image.

Figure 2:
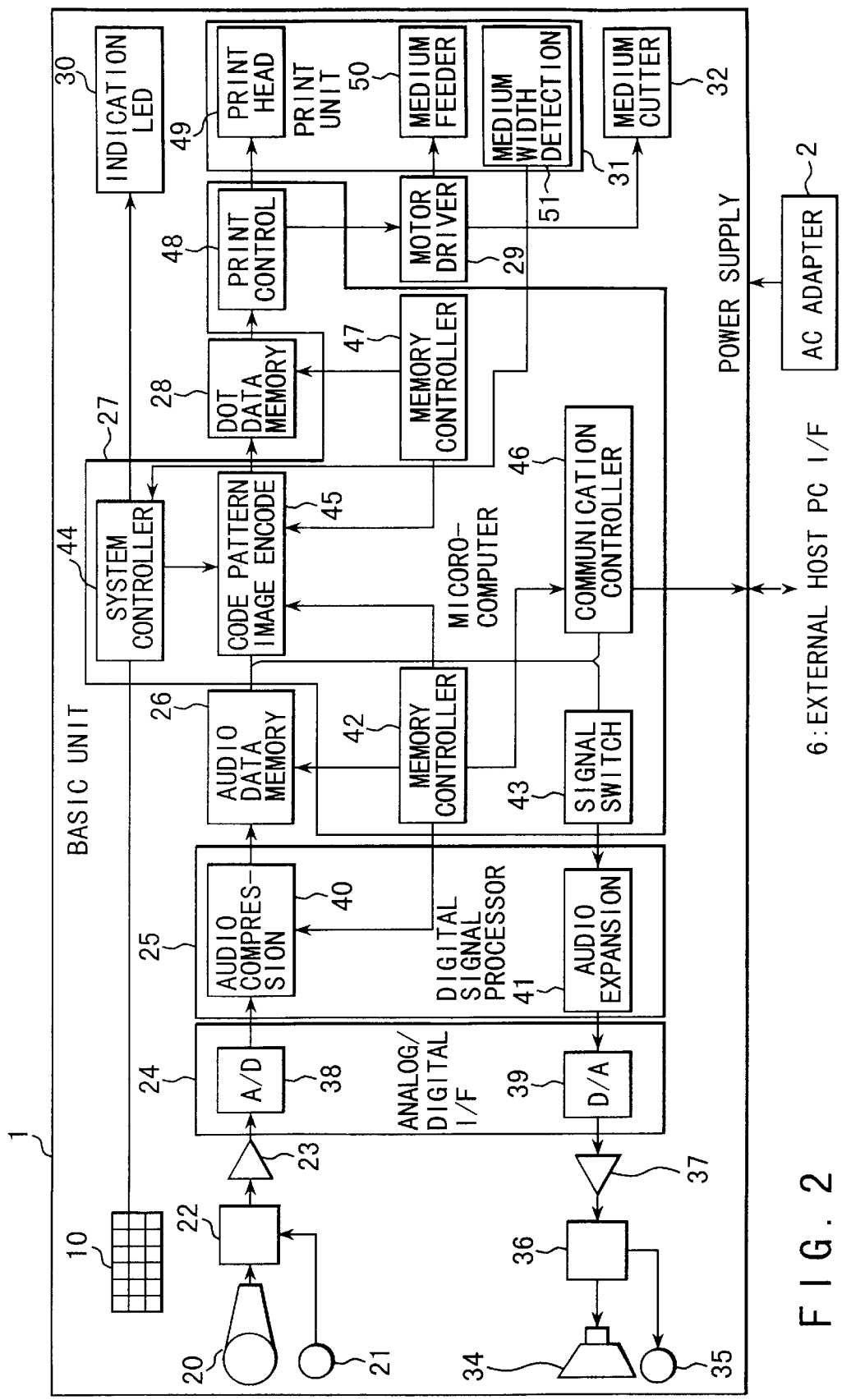
FIG. 2 is a block diagram showing the internal arrangement of the code pattern image recording apparatus according to the present invention.

FIG. 2 shows the detailed arrangement of the code pattern image recording apparatus, and the arrangement will be explained below.

As shown in FIG. 2, audio information input from a built-in microphone 20 (corresponding to reference numeral 12 in FIG. 1) and external microphone terminal 21 is connected to the input of an A/D unit 38 in an analog/digital I/F 24 via a switch 22 and preamplifier•AGC 23. The output from the A/D unit 38 is connected to the input of an audio data memory 26 via an audio compression unit 40 in a digital signal processor 25.

The output from the audio data memory 26 is divided into two paths. One output is connected to the input of a dot data memory 28 via a code pattern image encode unit 45, and the other output is connected to the inputs of a loudspeaker 34 (corresponding to reference numeral 4 in FIG. 1) and external loudspeaker terminal 35 via an audio expansion unit 41 in the digital signal processor 25, a D/A unit 39 in the analog/digital I/F 24, an active filter & power amplifier 37, and a switch 36.

The output from the dot data memory 28 is connected to a print head 49 of a print unit 31 via a print control unit 48. The other output of the print control unit 48 is connected to a medium feeder 50 and medium cutter 32 (which is interlocked with a lever indicated by reference numeral 8 in FIG. 1). The output from a medium width detection unit 51 in the print unit 31 is connected to the input of a system controller 44.

Furthermore, the output from a memory controller 47 in a microcomputer 27 is connected to the inputs of the dot data memory 28 and the code pattern image encode unit 45, and the output from a memory controller 42 is connected to the inputs of the audio compression unit 40, the audio data memory 26, the code pattern image encode unit 45, and a communication controller 46.

The output from the operation switches 10 is connected to an indication LED 30 via the system controller 44, and the output from the system controller 44 is connected to the input of the code pattern image encode unit 45. In addition, the AC adapter 2 is connected to a predetermined terminal, and the communication controller 46 is connectable to the external host PC I/F 6.

In this arrangement, when the operator operates the operation switches 10 to instruct a voice input, audio information is input from the built-in microphone 20 or external microphone terminal 21. The input audio information is input to the preamplifier•AGC 23 via the switch 22. The audio information is subjected to amplification and AGC in the preamplifier•AGC 23. The processed audio information is converted into a digital signal by the A/D unit 38, and the digital signal is compressed by the audio compression unit 40. The compressed signal is then stored in the audio data memory 26.

When the operator operates the operation switches 10 to instruct reproduction of the stored audio information for the purpose of confirmation, the data stored in the audio data memory 26 is input to and expanded by the audio expansion unit 41 via the signal switch 43 under the control of the system controller 44. The expanded data is converted into analog data by the D/A unit 39, and the analog data is subjected to filtering and amplification in the active filter & power amplifier 37. The processed data is then reproduced from the built-in loudspeaker 4 or external loudspeaker terminal 35 via the switch 36.

Subsequently, when the operator operates the operation switches 10 to instruct printing, the code pattern image encode unit 45 reads out digital data from the audio data memory 26 and converts it into a code pattern image under the control of the system controller 44. The converted code pattern image is stored in the dot data memory 28. Upon conversion, the medium width detection unit 51 detects the width of the medium on which the code pattern image is to be printed, i.e., the length of the tape-like medium in a widthwise direction perpendicular to its feed direction, and inputs the information associated with the length to the system controller 44. The system controller 44 then controls the code pattern image so that its arrangement does not exceed the width of the print medium. After that, the code pattern image is optically readably recorded at a predetermined position on the print medium via the print head 49 of the print unit 31 under the control of the print control unit 48.

At this time, a motor driver 29 controls driving of the medium feeder 50 of the print unit 31 under the control of the print control unit 48. The print medium is sequentially fed in a predetermined direction while inserting a code pattern image non-recording region 131 (see FIG. 1) in units of predetermined print recording lengths of the code pattern image to be continuously printed and recorded, along the feed direction of the print medium. The practical insertion method of the code pattern image non-recording region will be explained later.

Upon completion of recording of the code pattern image onto the print medium, the operator cuts the printed print medium 13 from that in the cartridge using the medium cutter 32, thus obtaining a print medium 13 on which desired audio information is printed as a code pattern image.

Figure 3A:
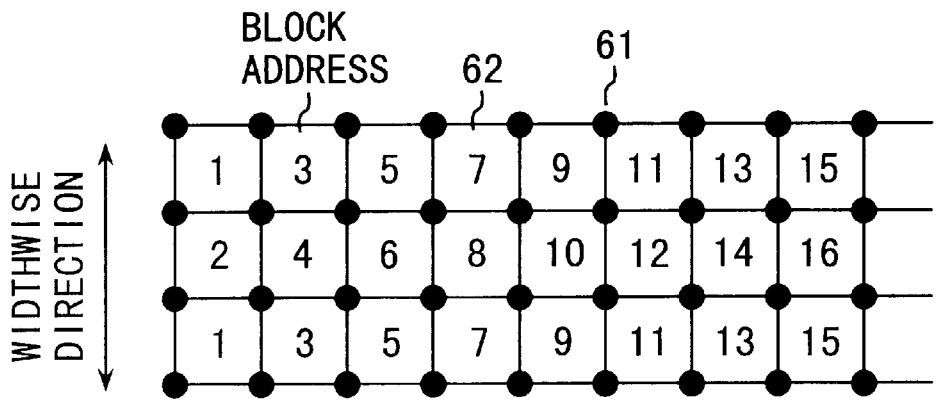
FIG. 3A shows the format of a dot code as an example of a code pattern image used in the present invention.
Figure 3B:
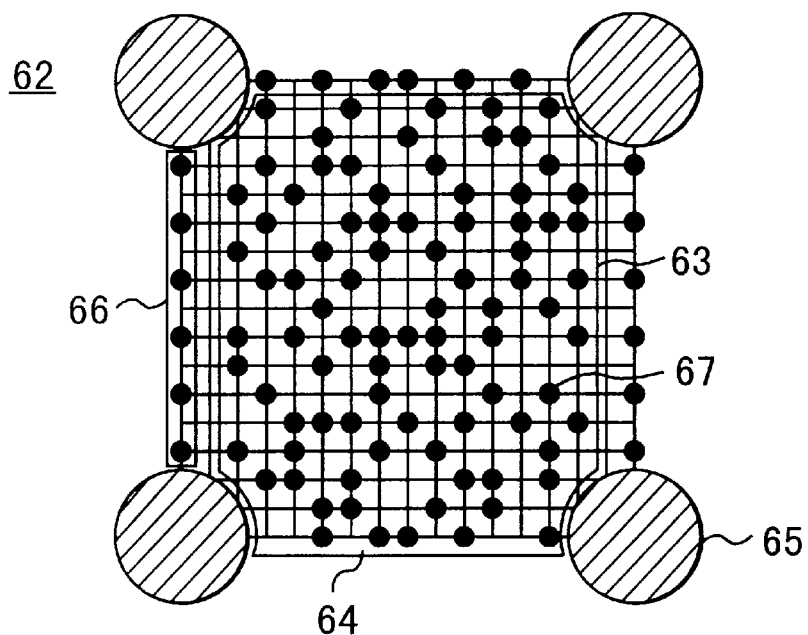
FIG. 3B shows the detailed format of a block.
Figure 3C:
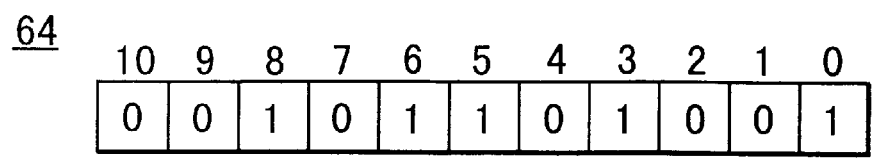
FIG. 3C shows the detailed format of a block header portion.

FIGS. 3A to 3C show the format of a dot code as an example of the code pattern image, and the dot code will be explained below. As shown in FIG. 3A, multimedia information including audio information, video information, digital code data, and the like is recorded on a sheet-like recording medium such as a paper sheet as an optically readable code pattern image using a dot code 61. The dot code 61 consists of blocks 62 each consisting of a set of predetermined dots and arranged in a two-dimensional matrix.

According to the code pattern image as a set of a plurality of blocks, since the shape and size of the code pattern image can be relatively freely changed and adjusted using blocks as minimum adjustment units, it is very convenient and easy to divide the code pattern image and to insert a code pattern image non-recording region. Hence, such code pattern image is especially suitable for the code pattern image recording apparatus of the present invention.

Even when the dot code 61 with such physical format is larger than the imaging field of an imaging sensor such as a CCD of a reader, in other words, even when the dot code 61 cannot be sensed by the imaging sensor in one shot, data associated with original audio information or the like can be reconstructed by combining data in units of blocks as long as the code can be read in units blocks and the block addresses in the read blocks can be confirmed. As a consequence, a large volume of information that cannot be realized by a conventional one- or two-dimensional barcode or the like can be held on, e.g., the sheet surface, and various applications that cannot be hit upon with the conventional method are expected in an information transmission method using paper and the like as media.

FIG. 3B shows the format of a block 62 which makes up the dot code 61 in more detail. As shown in FIG. 3B, the block 62 has a data dot pattern portion 63 obtained by modulating data associated with information and arranging them in correspondence with bit values, and a block header portion 64 which has a predetermined positional relationship with the data dot pattern portion 63, and indicates information such as an address of that block or the like.

The block 62 also has markers 65 which are located at predetermined positions, e.g., the four corners of the block, and are used for recognizing the block, and a matching dot pattern portion 66 which is located at a predetermined position with respect to the markers 65, e.g., between the markers that neighbor in a first direction. Note that the block header portion 64 is set at a predetermined position with respect to the markers 65, e.g., between the markers that neighbor in a second direction.

Data dots 67 distributed on these matching dot pattern portion 66, block header portion 64, and dot pattern portion 63 are made up of a plurality of dots having the same size. Each marker 65 is formed as a dot having a larger area than these dots, and is recorded on a recording medium as a dot having a diameter, e.g., five times that of the data dot 67.

The operation of the code pattern image recording apparatus of the present invention will be described below with reference to the flow chart in FIGS. 4A and 4B. Note that the concept of the code pattern image non-recording region, separator line, cut shape, perforations as the characteristic features of the present invention will be described in detail later.

When the operation starts, the apparatus is initialized (step S1). For example, various variables and flags are initialized. Subsequently, insertion of a medium is detected (step S2), and the medium width detection unit 51 detects the width of the medium (step S3). If the operation continues (step S4), the input mode is detected (step S6). If the operation setup mode is set, the selected setup mode is detected (step S7), and processing corresponding to the detected mode is executed.

More specifically, if the setup mode is "to set non-insertion of non-recording region", the print recording length is set at infinity (maximum or no limitation) (step S8), and the non-recording region length is set at zero (step S9). Also, an index is set to be "none" (step S10), perforations are set to be "none" (step S11), medium cutting is set to be "none" (step S12), and an automatic change mode is set to be "none" (step S13). After these steps, the flow returns to step S2.

On the other hand, if the setup mode is "to set insertion of non-recording region", and if a print recording length setup input is detected, a print recording length is selected and set (steps S17 and S18); if a non-recording region length setup input is detected, a non-recording region length is selected and set (steps S19 and S20); if an index setup input is detected, an index is selected and set (steps S21 and S22); if a perforation setup input is detected, perforations are selected and set (steps S23 and S24); if a cutting setup input is detected, a cutting mode is set (steps S25 and S26); if an automatic change setup input is detected, an automatic change mode is selected and set (steps S27 and S28); and if a reading stability setup input is detected, reading stability is set (steps S29 and S30). if none of the above setup inputs is detected, a setup input error is displayed (step S31), and the flow returns to step S2. After the above setups, the flow also returns to step S2.

If the setup mode is "to set medium use efficiency", the medium width is detected (step S14), a medium use efficiency mode is selected (step S15), and a block layout is set (step S16). The flow then returns to step S2.

On the other hand, if it is determined in step S6 that an operation mode is selected, the selected operation mode is detected (step S32). If the detected operation mode is a recording mode, recording is executed (step S33); if it is a reproduction mode, reproduction is executed (step S34); if it is a print mode, encoding and printing are executed (step S35). The flow then returns to step S2. On the other hand, if no input mode is detected in step S6, the flow also returns to step S2.

If it is determined in step S4 that the operation is to end, the flow advances to step S5 to end all the operations.

Figure 5:
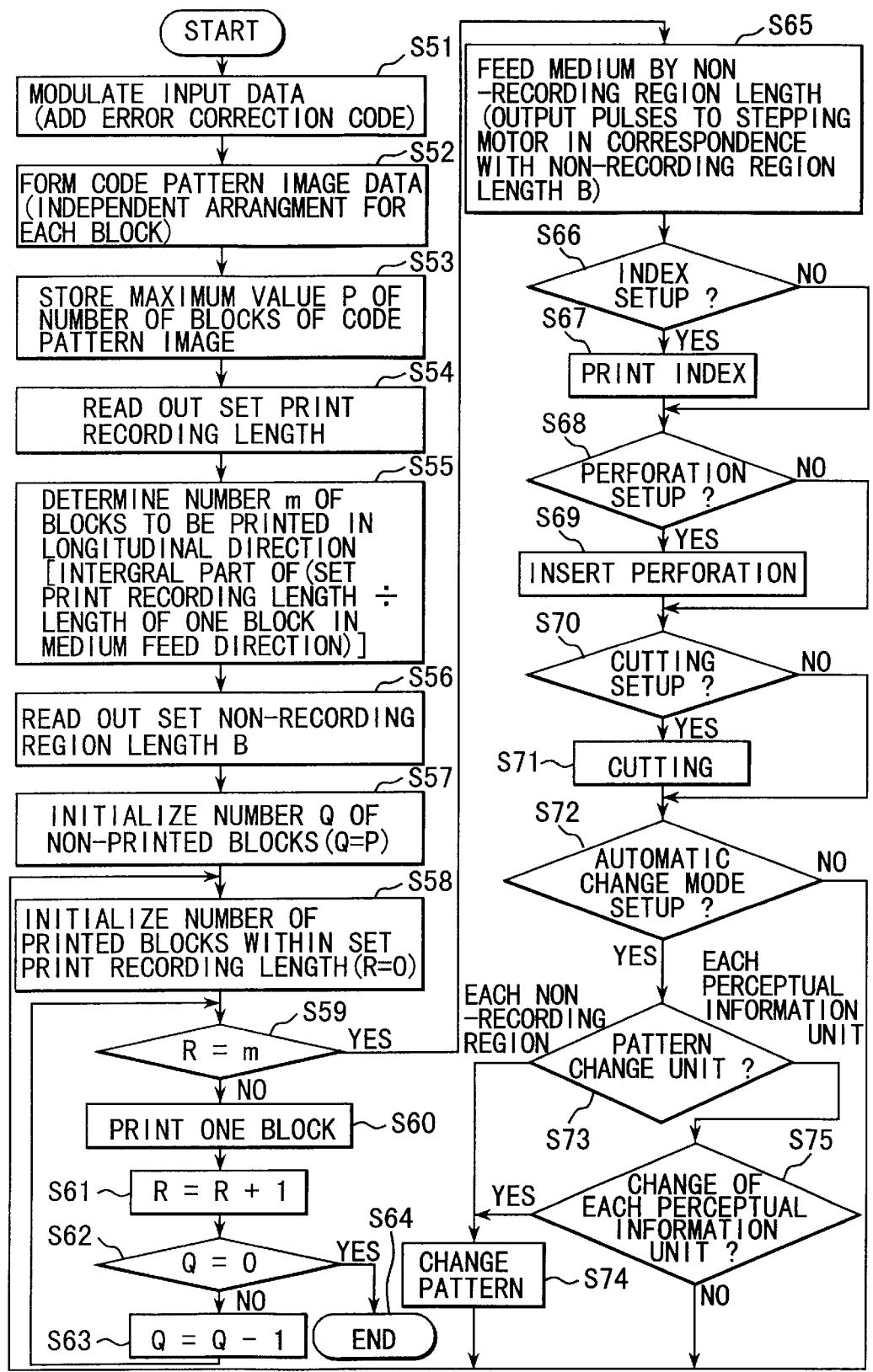
FIG. 5 is a flow chart showing encoding and printing in FIGS. 4A and 4B.

Encoding and printing will be explained in detail below with reference to the flow chart in FIG. 5.

If this operation starts, input data is modulated (step S51). Note that the input data is processed in the audio data memory 26, and an error correction code is added thereto. Subsequently, code pattern image data are formed (step S52). The code pattern image data has independent arrangements in units of blocks. A maximum value P of the number of blocks of the code pattern image is stored (step S53), the set print recording length is read out (step S54), and the number m of blocks to be printed in the longitudinal direction is determined (step S55). The number m can be obtained by dividing the set print recording length by the length of one block in the medium feed direction.

After that, a set non-recording region length B is read out (step S56), and the number Q of non-printed blocks is initialized (Q=P) (step S57). The system controller 44 then initializes the number R of printed blocks within the set print recording length (R=0) (step S58), and checks if blocks, which are just included in the set print recording length, have been printed, i.e., R=m (step S59).

If R≠m, i.e., blocks, which are just included in the set print recording length, have not been printed yet, printing for one block is done (step S60), and a counter R for the number of printed blocks within the set print recording length is incremented (step S61). Subsequently, it is checked if all the blocks to be printed have been printed, i.e., Q=0 (step S62). If all the block have not been printed yet, a counter Q for the number of non-printed blocks of all the blocks to be printed is decremented (step S63), and the flow returns to step S59. If all the blocks have been printed, the operation ends (step S64).

On the other hand, if it is determined in step S59 that R=m, i.e., if blocks, which are just included in the set print recording length, have been printed, the a medium is fed in correspondence with the non-recording region length (by outputting pulses of a stepping motor corresponding to the non-recording region length B) (step S65). Then, if the index, perforation, and cutting mode are set, the index printing, perforation insertion, and cutting are done (steps S66 to S71). If the automatic change mode is set (step S72), the pattern change unit is detected (step S73). If the pattern is to be changed in units of non-recording regions, pattern change processing is executed (step S74); if the pattern is to be changed in correspondence with perceptual information units, a change in perceptual information unit is detected (step S75). If a change is detected, the flow advances to step S74; otherwise, the flow returns to step S58.

In this embodiment, the operation mode is detected in step S32 to selectively execute one of the recording mode, reproduction mode, and print mode. Alternatively, as described in Japanese Patent Application No. 9-277422 by the present applicant, one mode may be executed during execution of another mode.

More specifically, encoding is done immediately after the recording mode is executed, and the reproduction mode is executed during encoding, that is, encoding and reproduction are executed time-divisionally. After that, printing can be done. Encoding corresponds to steps S51 to S53 in FIG. 5, and printing corresponds to step S54 and the subsequent steps therein. With such operation, code image printing can be started nearly without delay after the end of recording. Hence, temporal efficiency until the objective of printing a code image is achieved can be effectively improved in both real time and perceptual time.

In this embodiment, after independent code pattern image data are formed in units of blocks and the maximum value P of the number of blocks is stored in steps S52 and S53, the set print recording length is read out in step S54. Hence, at the time of step S54, i.e., immediately before the start of printing, the print recording length can be changed, and a printout can be obtained under the latest operation setup conditions.

Furthermore, in this embodiment, even when the print mode is continuously selected, similar code formation is done. Alternatively, only when the recording mode is selected before the print mode is selected, the processing in steps S51, S52, and S53 may be executed.

More specifically, since the output from the code pattern image encode unit 45 (FIG. 2) is held in the dot data memory 28 as a memory means, the above-mentioned processing can be realized in such a manner that the system controller 44 and memory controller 47 select and control whether the code pattern image to be input to the print control unit 48 is the one held in the dot data memory 28 or the one newly encoded by the code pattern image encode unit 45.

In this case, the code pattern image data, the maximum value P of the number of blocks thereof, and information indicating whether or not the recording mode has been selected (recording mode selection flag) must be kept held, and at the time of completion of printing upon selection of the print mode, the recording mode selection flag must be cleared to set a state wherein the recording mode is not selected. With such processing, even when the print mode is successively selected (when an identical code is to be printed out a plurality of number of times, or when the operation setups are changed and a code is to be printed out again), time-intensive processing such as error correction code addition (including interleave processing), modulation, formation of code pattern image data, and the like need not be performed for the second and subsequent print jobs, and the code pattern image data held in the memory can be immediately printed, thus quickly obtaining a printout.

Print media according to the first to eighth embodiments realized by the code pattern image recording apparatus according to the present invention with the above arrangement and operation will be explained below.

The first embodiment will be explained first.

Figure 6:
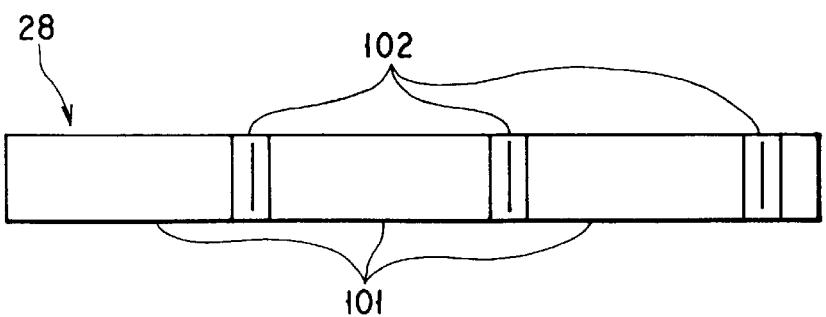
FIG. 6 shows the storage contents of a dot data memory 29 that realizes a print medium by a code pattern image recording apparatus according to the first embodiment.

FIG. 6 shows the recording contents of the dot data memory 28 to obtain a print medium by a code pattern image recording apparatus according to the first embodiment, and the recording contents will be described below.

The code pattern image recording apparatus according to the first embodiment also stores a non-recording region as code pattern image data in the dot data memory 28, and prints a print recording region and non-recording region in single print control.

In order to implement such processing, as shown in FIG. 6, the dot data memory 28 stores code pattern image data 101 of print recording regions, and code pattern image data 102 of non-recording regions inserted between adjacent recording regions. With such storage contents, the control program can be simplified, and the medium feed speed remains the same on both the print recording regions and non-recording regions. Especially, a code pattern image portion near the boundary between given print and non-recording regions can be printed with a stable shape and density.

Figure 7:
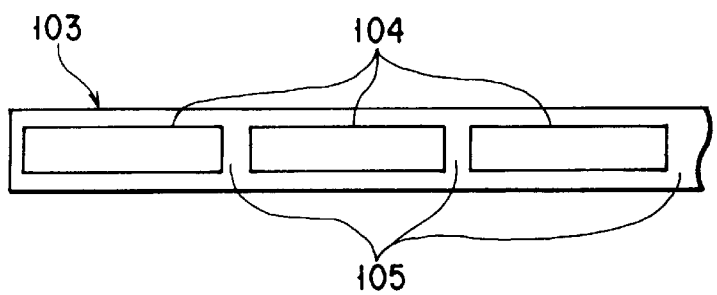
FIG. 7 shows the arrangement of the print medium by the code pattern image recording apparatus according to the first embodiment.

FIG. 7 shows the arrangement of a print medium by the code pattern image recording apparatus according to the first embodiment. As shown in FIG. 7, according to the code pattern image recording apparatus of the first embodiment, divided code pattern image portions 104 are recorded in predetermined units on a print medium 103 by the above-mentioned method to sandwich non-recording regions 105 therebetween.

According to the first embodiment, when a code pattern image sequence is printed by dividing it into a plurality of recording regions, and inserting non-recording regions between adjacent recording regions, the code pattern image can be divided in units of desired lengths, and a layout nearly equal to a required length can be consequently realized upon paste/edit processes onto a sheet surface.

The second embodiment will be explained below.

Figure 8:
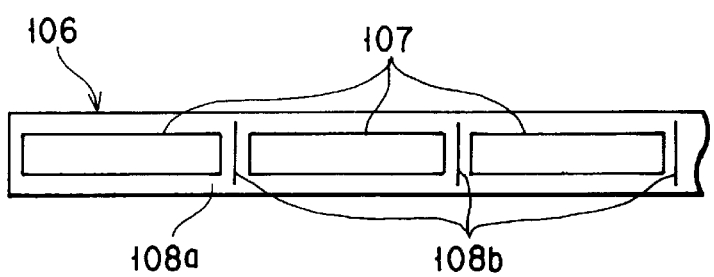
FIG. 8 shows the arrangement of a print medium by a code pattern image recording apparatus according to the second embodiment.

FIG. 8 shows the arrangement of a print medium by a code pattern image recording apparatus according to the second embodiment. As shown in FIG. 8, according to the code pattern image recording apparatus of the second embodiment, divisionally printed code pattern image portions 107 are recorded on a print medium 106 to sandwich non-recording regions 108a therebetween. Especially, separator lines 108b are printed on the non-recording regions 108a. Variations of the separator lines 108b are obtained by, e.g., changing the line type (solid line, wavy line, one-dashed chain line, triangular wave shape, wavy shape, rectangular wave shape, and the like), line width, line angle, line color (a color that has low spectrum sensitivity for a code pattern image reader is used as the line color, or the line color is changed in units of code pattern image sequences), and the like. However, the present invention is not limited to such variations, as a matter of course.

According to the second embodiment, since a non-recording region and separator line are inserted between adjacent divisionally printed code pattern image portions, the user can easily cut the print medium with, e.g., scissors with reference to such lines. When the separator lines are changed in units of code pattern image sequences according to, e.g., the above-mentioned variations, different code pattern images can be easily identified upon pasting onto a sheet surface after the print medium is cut into pieces. In this way, code pattern images can be prevented from being erroneously identified and edited, so as to avoid read errors upon reproduction. Furthermore, when the separator lines are changed in units of divided code pattern image portions, the order of code pattern image portions can be detected upon pasting onto a sheet surface after the print medium is cut into pieces. As a result, in a code pattern image including a plurality of different information sources, such different information sources can be simultaneously scanned, and can be reproduced in the read order.

The third embodiment will be explained below.

Figure 9:
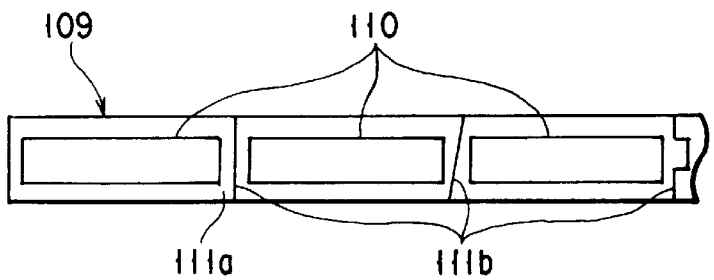
FIG. 9 shows the arrangement of a print medium by a code pattern image recording apparatus according to the third embodiment.

FIG. 9 shows the arrangement of a print medium by a code pattern image recording apparatus according to the third embodiment. As shown in FIG. 9, according to the code pattern image recording apparatus of the third embodiment, divisionally printed code pattern image portions 110 are recorded on a print medium 109 to sandwich non-recording regions 111a therebetween. Especially, at the position of each non-recording region 111a, the print medium 109 is cut by the medium cutter 32 to have a cut pattern 111b. Variations of the cut pattern 111b can be obtained by, e.g., changing the angle of a linearly cut line, the cut line type (triangular wave shape, wavy shape, rectangular wave shape, and the like), changing the phase of the cut pattern (triangular wave shape, wavy shape, rectangular wave shape, and the like), and so on.

According to the third embodiment, since the cut patterns are changed in units of code pattern image sequences or sets of print information, even when there are a plurality of different cut patterns, different code pattern images can be identified with reference to such patterns upon pasting onto a sheet surface after the print medium is cut into pieces. Hence, edit and read errors can be avoided. Because the cut patterns are changed in units of divided code pattern image portions, even when there are a plurality of different cut patterns, the order of code pattern images can be identified with reference to these patterns upon pasting onto a sheet surface after the print medium is cut into pieces. As a consequence, in a code pattern image including a plurality of different information sources, such different information sources can be simultaneously scanned, and can be reproduced in the read order.

The fourth embodiment will be explained below.

Figure 10:
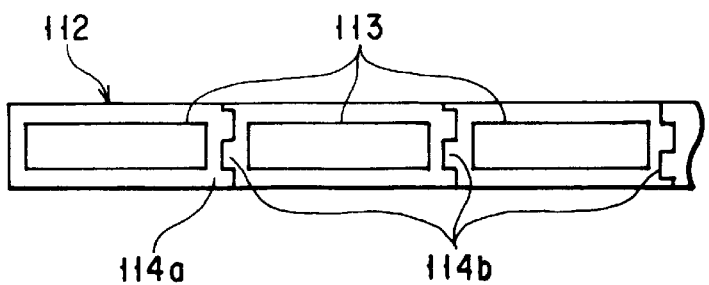
FIG. 10 shows the arrangement of a print medium by a code pattern image recording apparatus according to the fourth embodiment.

FIG. 10 shows the arrangement of a print medium by a code pattern image recording apparatus according to the fourth embodiment. As shown in FIG. 10, according to the code pattern image recording apparatus of the fourth embodiment, a print medium 112 is cut at the positions of non-recording regions 114a in units of divided code pattern portions 113. Especially, the print medium 113 is cut at the positions of the non-recording regions 114a to have cut patterns 114b with different phases. More specifically, FIG. 10 illustrates three cut patterns 114b having different phases.

According to the fourth embodiment, since the phases of the cut patterns are changed in units of code pattern image sequences or sets of print information, even when there are a plurality of different cut patterns, different code pattern images can be identified with reference to such patterns upon pasting onto a sheet surface after the print medium is cut into pieces. Hence, edit and read errors can be avoided. As the phases of the cut patterns are changed in units of divided code pattern image portions, even when there are a plurality of different cut patterns, the order of code pattern images can be identified with reference to these patterns upon pasting onto a sheet surface after the print medium is cut into pieces. As a consequence, in a code pattern image including a plurality of different information sources, such different information sources can be simultaneously scanned, and can be reproduced in the read order.

Note that the cut patterns are obtained by a cut/division mechanism shown in FIG. 11.

As shown in FIG. 11, two, upper and lower metal plates 321 each having a rectangular wave shape are held by upper and lower holders 323a and 323b, the two end portions of which are connected via spring shafts 322. Each metal plate 321 is formed with a shaved blade at its side end face. When the upper holder 323a vertically moves upon rotation of a cam (not shown), the upper and lower blades clamp a print medium 324 therebetween, thus forming a different cut pattern 325. The lower holder 323b is placed on a slide rail (not shown), and both the upper and lower holders 323a and 323b slide in the slide direction via a rack & pinion mechanism (not shown), thus controlling the phase of the cut pattern.

The fifth embodiment will be explained below.

FIGS. 12A and 12B show the arrangement of a print medium by a code pattern image recording apparatus according to the fifth embodiment. As shown in FIGS. 12A and 12B, according to the code pattern image recording apparatus of the fifth embodiment, code pattern image portions 116 divisionally printed on a print medium 115 are cut at the positions of non-recording regions 117a. Especially, the print medium 115 is cut at the positions of the non-recording regions 117a to have cut patterns 117b that make different angles with the edge of the print medium. The cut pattern 117b is formed so that the code pattern images on the individual print media and their orders can be identified even when the print media rotate 180°. Variations of the cut pattern 117b can be combined with those obtained by changing the angle of a linearly cut line, the cut line type (triangular wave shape, wavy shape, rectangular wave shape, and the like), changing the phase of the cut pattern (triangular wave shape, wavy shape, rectangular wave shape, and the like), and so on.

According to the fifth embodiment, since the cut patterns are changed in units of code pattern image sequences or sets of print information, even when there are a plurality of different cut patterns, different code pattern images can be identified with reference to such patterns upon pasting onto a sheet surface after the print medium is cut into pieces. Hence, edit and read errors can be avoided. Also, even when the cut print medium portions rotate 1800, the code pattern images and their orders on the individual print medium portions can be identified.

Also, since the cut patterns are changed in units of divided code pattern image portions, even when there are a plurality of different cut patterns, the order of code pattern images can be identified with reference to these patterns upon pasting onto a sheet surface after the print medium is cut into pieces. Consequently, in a code pattern image including a plurality of different information sources, such different information sources can be simultaneously scanned, and can be reproduced in the read order.

More specifically, a cut pattern 120b shown in FIGS. 13A and 13B forms identical cut portions 119a and 119b when the print medium is cut along the cut pattern 120b. Hence, these cut portions cannot be distinguished from each other. However, according to the fifth embodiment, such problem can be solved.

The sixth embodiment will be explained below.

FIG. 14 shows the arrangement of a print medium by a code pattern image recording apparatus according to the sixth embodiment. As shown in FIG. 14, divisionally printed code pattern image portions 122 are recorded on a print medium 121, and perforations 123b as yardsticks for assisting accurate cutting are formed on a non-recording region 123a inserted between adjacent code pattern image portions 122 by a known perforation formation means. Variations of the perforations 123b can be obtained by changing the line type (changing the perforation interval, or changing the shape such as a triangular wave shape, wavy shape, and the like), changing the number of lines that form the perforations, changing the angle of the perforations, and so on.

According to the sixth embodiment, since perforations are formed on a non-recording region between adjacent code pattern image portions, the user can easily cut and divide the print medium without using any tools such as scissors. Also, the print medium can be easily folded at the positions of the non-recording regions between adjacent code pattern image portions, and a code pattern image sequence can be folded without being cut. Hence, the obtained print medium can be stored compact, and read errors in later processes can be prevented from increasing. Furthermore, since the patterns of the perforations are changed in units of code pattern image sequences, different code pattern images can be identified upon pasting onto a sheet surface after the print medium is cut into pieces, read errors due to wrong edit positions can be avoided. The patterns of the perforations are changed in units of divided code pattern portions, so the order of code pattern image portions can be identified upon pasting onto a sheet surface after the print medium is cut into pieces. As a result, in a code pattern image including a plurality of different information sources, such different information sources can be simultaneously scanned, and can be reproduced in the read order.

The seventh embodiment will be described below.

Conventional hand-scan reading is done under the assumption that a code pattern image is printed on a medium such as a paper sheet surface having a sufficiently large width in a direction perpendicular to the print direction of the code pattern image to be printed. Hence, the degree of reading stability is determined by only setting the number of repetitions of an identical block in the widthwise direction agreeing with the direction perpendicular to the print direction of the code pattern image to be printed. Hence, when the print medium has a small width, an identical block cannot be repetitively formed as the user has set, and the printed code pattern image is partially lost, resulting in read errors.

The seventh embodiment is achieved in consideration of such situation.

FIGS. 15A to 15E show a code pattern image recorded on a print medium by a code pattern image recording apparatus according to the seventh embodiment. In the seventh embodiment, the width of the print medium is automatically detected, and the arrangement of a code pattern image on the print medium is automatically changed to improve reading stability upon reading the printed code pattern image.

In such print medium width detection, the length of a cavity of an ink cartridge that stores an ink ribbon and tape-like print medium is detected, and the width of the print medium is obtained by looking up a table that stores the types of cartridge supplied for individual printers. The length of the cavity is detected in such a manner that an extendable shaft held by a spring changes the resistance of a slide resistor, and a voltage generated across the resistor is input to an A/D converter of a control microcomputer. The converted digital voltage value corresponds to the length of the cavity, and the printable width of the print medium is obtained by looking up the table, which is stored in the memory space of the microcomputer and provides the relationship between the lengths of cavities and the widths of print media supplied.

Upon determination of the arrangement of the code pattern image to be printed, the number (n) of minimum units of the pre-stored code pattern image to be printed, which can fall within the detected printable width of the print medium, is calculated, and the arrangement of the code pattern image is determined based on the calculated value. In the arrangement of the code pattern image, identical code blocks are repetitively set in the widthwise direction of the print medium, except for a basic layout in which only one code block falls within the width of the print medium.

Figure 15A:
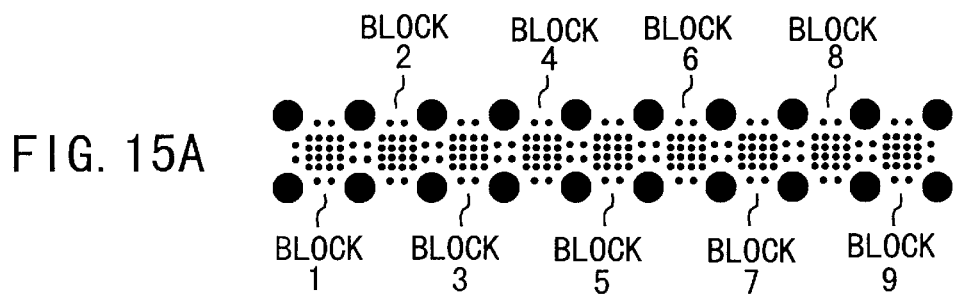
FIG. 15A shows the format associated with the basic layout of a code pattern image of a print medium by a code pattern image recording apparatus according to the seventh embodiment.
Figure 15B:
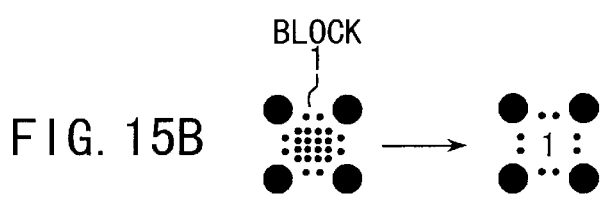
FIG. 15B simply shows a block.
Figure 15C:
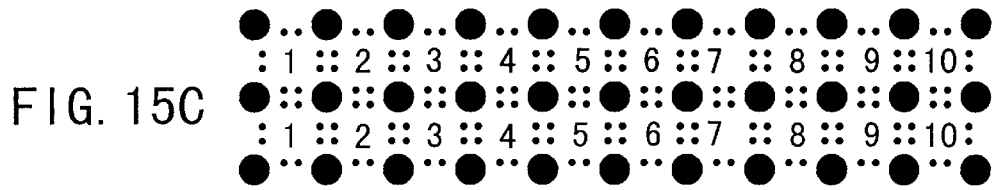
FIG. 15C shows a code pattern image layout when the number n of blocks=2.
Figure 15D:
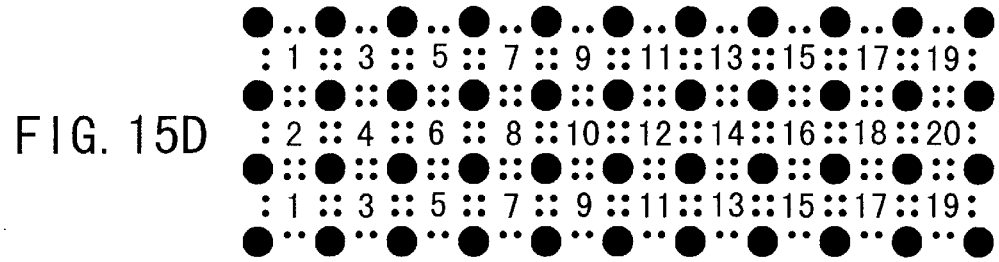
FIG. 15D shows a code pattern image layout when the number n of blocks=3.
Figure 15E:
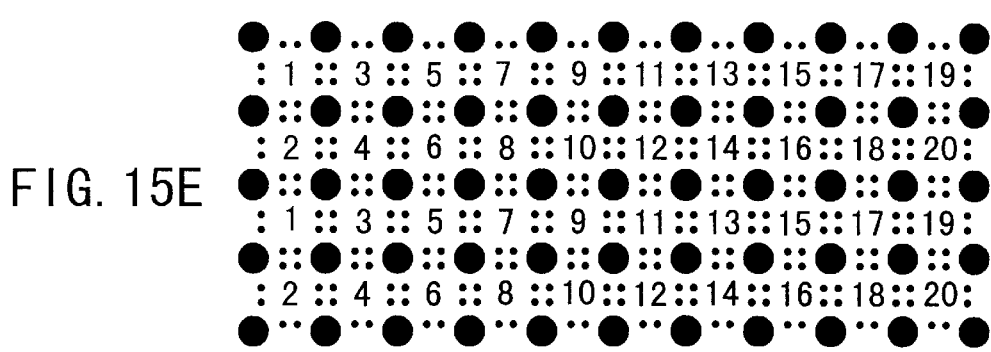
FIG. 15E shows a code pattern image layout when the number n of blocks=4.

FIG. 15A shows the basic layout of the code pattern image, and the following description will be given using a simplified block, as shown in FIG. 15B. FIG. 15C shows the code pattern image layout when the number n of blocks=2. In this example, identical blocks repeat themselves in two, upper and lower rows. FIG. 15D shows the code pattern image layout when the number n of blocks=3. In this example, identical blocks repeat themselves in the first and third rows. FIG. 15E shows the code pattern image layout when the number n of blocks=4. In this examples, blocks in the first and third rows, and those in the second and fourth rows respectively have the same contents.

The eighth embodiment will be described below.

FIGS. 16A to 16E show the arrangement of a code pattern image recorded on a print medium by a code pattern image recording apparatus according to the eighth embodiment. In the eighth embodiment, the width of the print medium is automatically detected, and the arrangement of the code pattern image on the print medium is changed in accordance with the user's setups, i.e., the recording density priority setups (high medium use efficiency) or reading stability priority setups.

The print medium width detection is the same as that in the seventh embodiment, and a detailed description thereof will be omitted.

Upon determination of the arrangement of the code pattern image to be printed, the number (n) of minimum units of the pre-stored code pattern image to be printed, which can fall within the detected printable width of the print medium, is calculated. The arrangement of the code pattern image is determined in accordance with the number n of printable code blocks, and a level value (L) pertaining to the medium use efficiency and stability, i.e., corresponding to the user's setups indicating high medium use efficiency or reading stability priority setups. The arrangement of the code pattern image is obtained by executing a sequence corresponding to the element number (k) obtained by looking up an element number table that shows the relationship between n and L.

FIG. 16A shows an element number table when n ranges from 1 to 4, and L ranges from 1 to 4, and the arrangements of the code pattern images corresponding to the element numbers. As n is smaller, the width of the print medium is smaller; as L is smaller, higher medium use efficiency that places an importance on economy is attained.

In the basic layout shown in FIG. 16B, a code pattern image is printed in one row in the order from blocks with smaller code block numbers. At this time, the print start point is the left end of the code pattern image layout. In this case, in the element number table, n=1, L=1, and k=1.

In the layout shown in FIG. 16C (the number of blocks is four times that in FIG. 16B, and the recorded data volume is equal to that in FIG. 16B), a code pattern image is printed in one row in the order from blocks with smaller code block numbers. That is, in this layout, after blocks corresponding to the maximum value of the number of recorded code blocks are printed, the blocks are printed again from a minimum value, and a pattern including four repetitive block sequences is formed. In this case, in the element number table, n=1, L=4, and k=4.

In the layout shown in FIG. 16D (the number of blocks is four times that in FIG. 16B, and the recorded data volume is twice that in FIG. 16B), blocks are printed in a total of four rows by stacking two sets of identical blocks that are sequentially set in two, upper and lower rows. At this time, the print start point is the upper left point of the code pattern image layout. In this case, in the element number table, n=4, L=1, and k=13.

In the layout shown in FIG. 16E (the number of blocks is 16 times that in FIG. 16B, and the recorded data volume is twice that in FIG. 16B), the arrangement shown in FIG. 16D is repeated four times in the horizontal direction. At this time, the print start point is the upper left point of the code pattern image layout. In this case, in the element number table, n=4, L=4, and k=16.

Still another embodiment of the present invention will be described below. In this embodiment, the operation switches shown in FIG. 2 include a tone volume control switch using, e.g., a slide switch, or a variable resistor. In this case, the user can adjust the tone volume of audio information reproduced from one of the built-in loudspeaker 34 and external loudspeaker terminal 35 using the tone volume control switch, variable resistor, or the like.

Figure 4A:
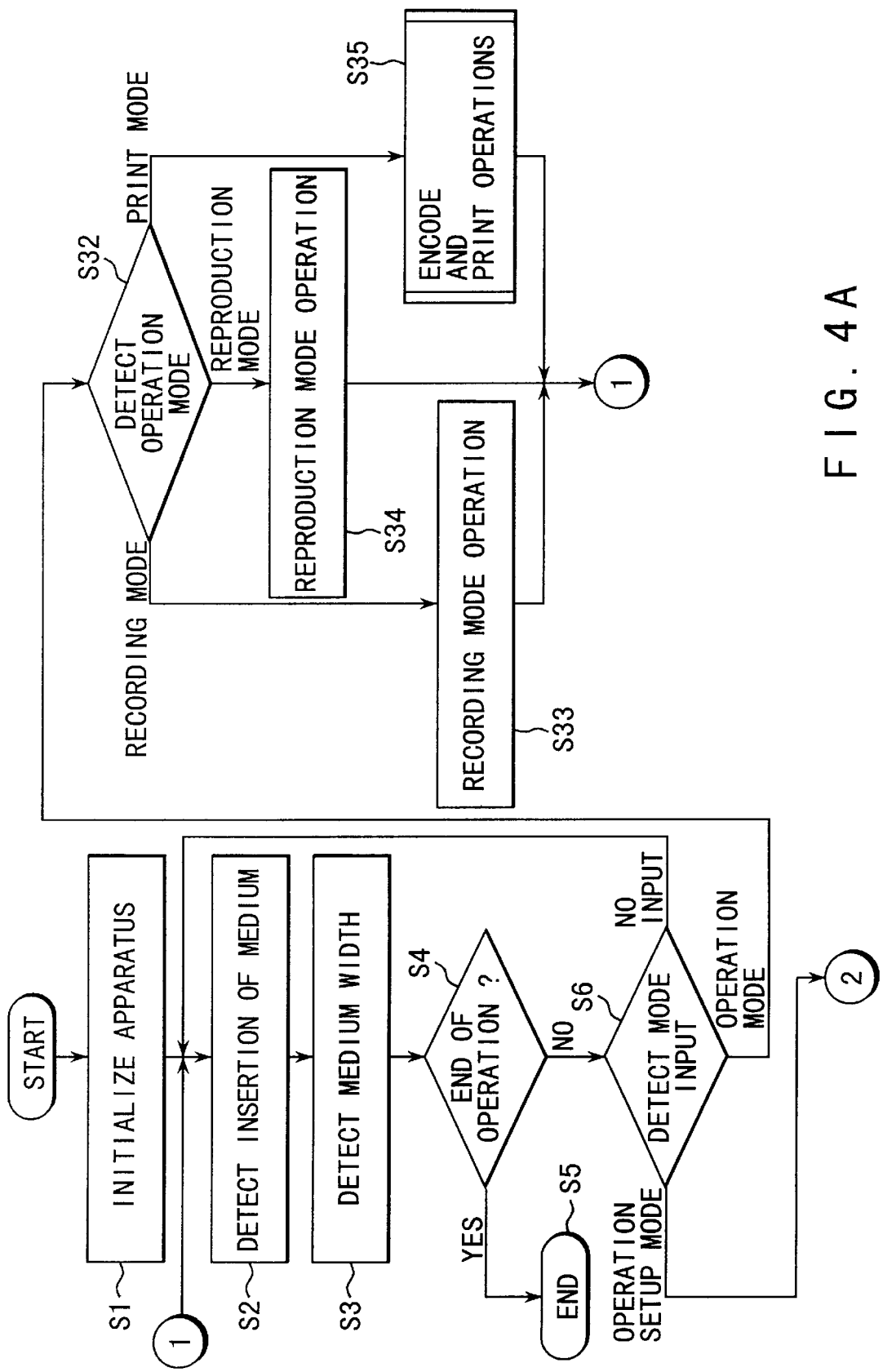
FIGS. 4A and 4B are flow charts showing the operation of the code pattern image recording apparatus according to the present invention.
Figure 4B:
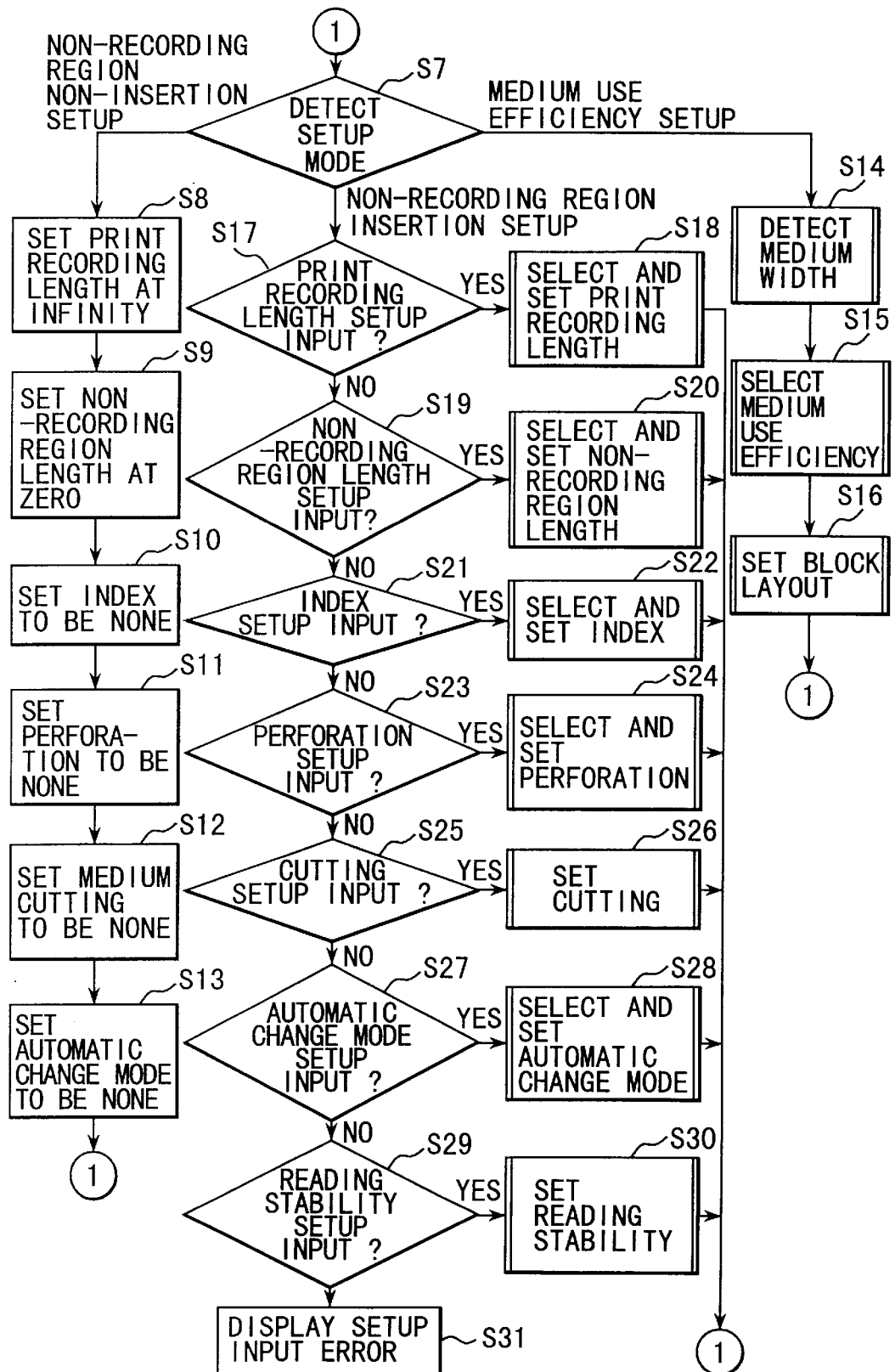

Upon selecting and setting the print recording length and non-recording region length in steps S18 and S20 shown in FIGS. 4A and 4B, they can be adjusted in an analog manner by detecting the manipulation amount for the tone volume control switch, variable resistor, or the like.

In this case, the system controller 34 must be able to recognize operation for the tone volume control switch, variable resistor, or the like at a timing other than audio reproduction as that for setting the image print recording length or code pattern image non-recording region length.

With this arrangement, the number of operation switches can be reduced, and a numerical value can be continuously set to delicately adjust the length. As a consequence, the degree of freedom in layout can be further increased. Also, since operation portions associated with functions that require continuous adjustment for, e.g., the tone volume and recording length are integrated, the user can perform simple operations without being confused.

Note that the tone volume control switch, variable resistor, or the like is preferably arranged as follows. That is, in order to reliably invalidate the manipulation amount for setting the code pattern image print recording length operated at a timing other than audio reproduction during the audio reproduction, the tone volume control is enabled only after the switch or variable resistor is reset to its minimum level. With this arrangement, even when a large code pattern image print recording length is set and the user forgets it, audio information can be prevented from being reproduced unexpectedly loud.

In addition to the above methods of setting the code pattern image print recording length and code pattern image non-recording region length, they may be simply set by selecting one of "long" and "short" switches with predetermined lengths.

A case will be explained below wherein index setups, perforation formation patterns, cutting mode of the medium, and the like in units of non-recording regions, described in step S75 in FIG. 5 in the operation of the code pattern image recording apparatus of the present invention can be changed to those in correspondence with perceptual information units of the input information.

The perceptual information unit indicates an information unit within which the user can visually or audibly recognize and understand the meaning of that information and which can be classified in units of kinds of information such as audio and image, or text, character, and the like. Also, the perceptual information unit indicates an information unit that can clearly distinguish even a plurality of pieces of audio information as the same kind of information to be different input units having different input timings.

In this case, in the automatic change mode in steps S13 and S28 in FIGS. 4A and 4B, the display pattern of an index, the formation pattern of perforations, and the cutting pattern of the medium are automatically changed in correspondence with each perceptual information unit in the input information or in units of non-recording regions.

Subsequently, a setup input considering reading stability in step S30 in FIGS. 4A and 4B will be explained below.

As has been described above with reference to FIG. 15, when the printed code pattern image is optically read by a manual scan in its longitudinal direction, the print medium must have a sufficiently large width in the direction perpendicular to its feed direction so as to improve reading stability.

This is because a plurality of redundant blocks (identical code blocks) having identical data and block addresses can be set in the widthwise direction of the print medium if the print medium has a sufficient width. In this way, even when the reader slightly meanders in the widthwise direction of the print medium due to a manual scan, and a certain block cannot be read, a block having the same block address as that block is likely to be read at another position, thus consequently improving stability upon reading.

Hence, when the width of the print medium used is determined, the arrangement of the code pattern image in its widthwise direction considering reading stability can be determined.

The width of the print medium used can be automatically detected by the length of, e.g., the cavity of an ink cartridge, as described above. FIG. 17 is a table showing the relationship between the digital voltage value as the detection result of the length of the cavity and the maximum number (n) of blocks in the widthwise direction of the print medium. This table is stored in the memory space of the microcomputer, and the arrangement of the code pattern image is determined using this table. Assume that each block has a predetermined size.

Figure 19:
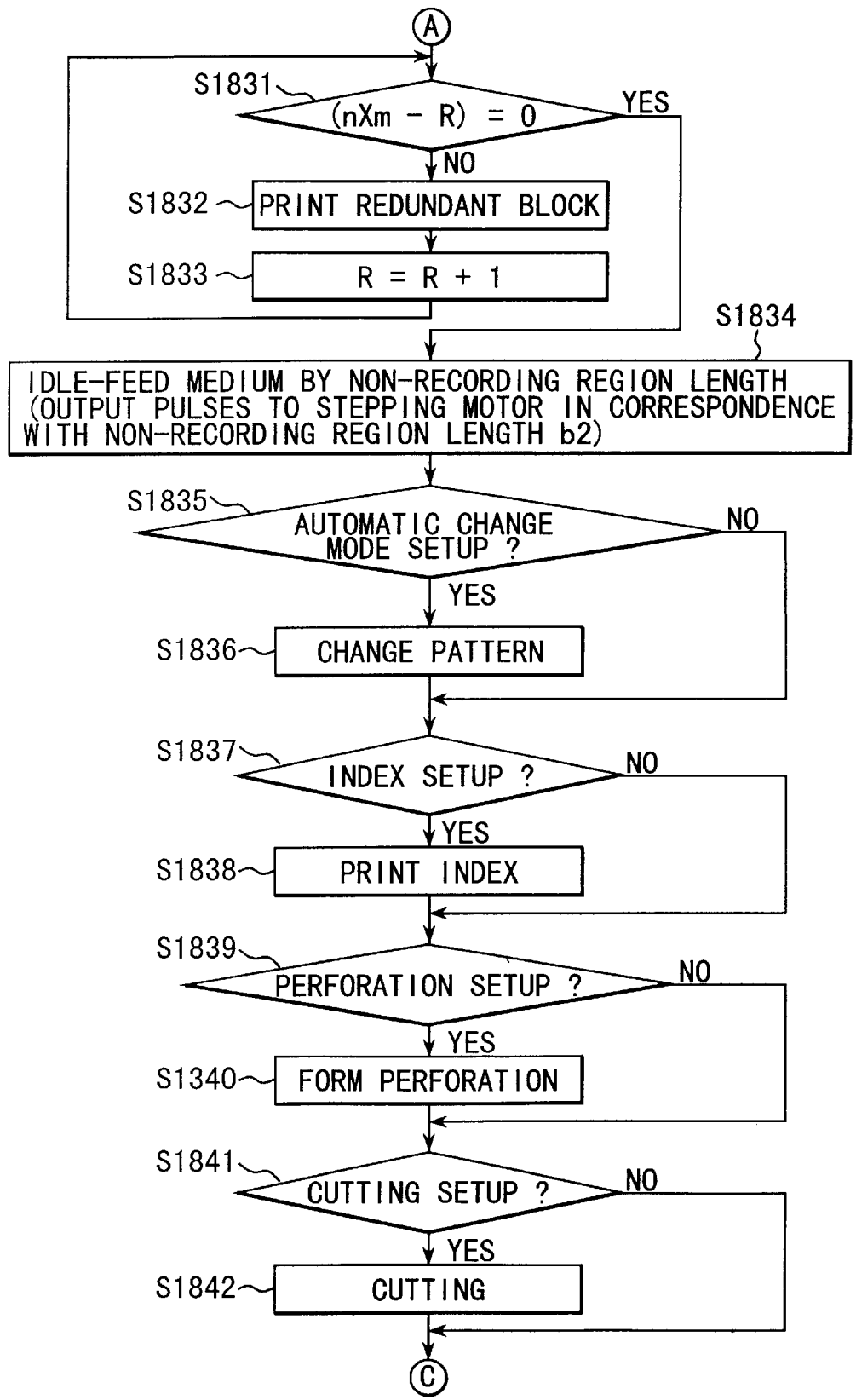
FIG. 19 is a flow chart which follows the flow chart shown in FIG. 18.

FIGS. 18 and 19 are flow charts showing another processing of the flow chart (details of encoding and printing in step S35 in FIGS. 4A and 4B) shown in FIG. 5, and the processing will be explained below.

When the operation starts, input data is modulated (step S1811). This is to perform the following adjustment. That is, in case of the dot code shown in FIGS. 3A and 3B, when the number of continuous black dots in a predetermined direction as data dots 67 in the data dot pattern portion 63 becomes equal to the number of continuous black dots that form the marker 65, it becomes hard to detect the marker 65 from the read image, and information can no longer be decoded. For this reason, the number of continuous black dots in the data dot pattern portion 63 is adjusted not to become equal to the number of continuous black dots that form the marker 65. This modulation processing is done in the audio data memory 26, and addition of an error correction code, interleave, and the like are also done.

Subsequently, code pattern image data is formed (step S1812). The code pattern image data has independent arrangements in units of blocks, which can be edited in units of blocks shown in FIGS. 3A and 3B. A maximum value P of the number of blocks of the code pattern image is stored on the basis of, e.g., the currently input audio information (step S1813), and the already set print recording length is read out (step S1814), thus determining the number m of blocks to be printed in the feed direction of the print medium (step S1815). The number m of blocks to be printed is given by the integral part of the value obtained when the print recording length of the code pattern image read out in step S1814 is divided by the length of one block in the medium feed direction as known information. The number m of blocks to be printed is multiplied by the maximum number n of printable blocks in the widthwise direction of the print medium, which has already been detected, so as to initialize a value R of the number of blocks of a code pattern image portion to be divisionally printed (the number of blocks in units of divided codes) (step S1816). Note that the maximum number n of printable blocks in the widthwise direction is the value obtained by excluding the number of redundant blocks set in consideration of reading stability in step S30 in FIGS. 4A and 4B, and n=2 in case of, e.g., FIG. 20A. Subsequently, the number Q (Q=P) of non-printed blocks is initialized (step S1817), and the already set code pattern image non-recording region length B (=b1+b2) is read out (step S1818).

If printing of a predetermined index has been set, the index is printed on an empty region at the beginning of the print medium (steps S1819 and S1820). Furthermore, in order to insert a code pattern image non-recording region, the print medium is idle-fed (the motor driver 29 outputs pulses required for feeding the print medium by a distance corresponding to the code pattern image non-recording region length b1 to a stepping motor as the medium feeder 50 shown in FIG. 2 so as to idle-feed the medium) (step S1821). The number of printed blocks within a divided code unit is initialized (S=0) (step S1822). In this case, after the predetermined index is printed, the print medium is idle-fed by the distance corresponding to the code pattern image non-recording region length b1. However, strictly speaking, the print medium is idle-fed by a distance obtained by subtracting the medium feed amount upon printing the index from b1.

Subsequently, the number R of blocks in units of divided codes is compared with the maximum number P of blocks. If R is larger than P, i.e., if the continuous print recording length of the code pattern image based on the input information is larger than the set print recording length (step S1823), the flow advances to step S1824, and the value R is decreased to insert redundant blocks in the feed direction of the print medium (in this case, the maximum number of blocks that can be recorded within the set print recording length remains the same). On the other hand, if P is equal to or smaller than R, i.e., the continuous print recording length of the code pattern image based on the input information is shorter than (or equal to) the set print recording length, the flow directly advances to step S1825.

S initialized in step S1822 is compared with the changed number R of blocks in units of divided codes (step S1825). If S is less than R, the flow advances to step S1826 to print one block sequence (n blocks). A counter S for the number of printed blocks within the set print recording length is incremented by n (step S1827), and a counter Q for the number of non-printed blocks of all the blocks to be printed is decremented by n (step S1828). It is then checked if all the blocks of the code pattern image based on the currently input information have been printed, i.e., Q≦0 (if the initial value of Q is not an integer multiple of n, it assumes a negative value after all the blocks have been printed) (step S1829). If all the blocks have not been printed yet, the flow returns to step S1825; otherwise, the operation ends.

On the other hand, if it is determined in step S1825 that S is equal to or larger than S, the flow advances to step S1831 to insert redundant blocks, and a redundant block is printed (step S1832) and R is incremented (step S1833) until (n×m−R)=0 holds. When all the blocks including redundant blocks have been printed within the set print recording length, the print medium is idle-fed (the motor driver 29 outputs pulses required for feeding the print medium by a distance corresponding to the code pattern image non-recording region length b2 to the stepping motor as the medium feeder 50 so as to idle-feed the medium) (step S1834).

Finally, if the automatic change mode that changes various patterns in units of code pattern image non-recording regions has been set (step S1835), the patterns are changed (step S1836), and printing of an index, formation of perforations, and cutting of the print medium are done in accordance with index, perforation, and medium cutting setups (steps S1837 to S1842). The flow then returns to step S1821.

The above processing is similarly repeated, and if it is determined in step S1829 that all the blocks have been printed, a series of operations end.

FIGS. 20A to 20E show examples of a print medium formed by the above-mentioned processing.

FIG. 20A shows a print medium obtained when no redundant blocks are inserted, only code pattern image non-recording regions are inserted under the conditions shown in FIG. 20B, and a code pattern image based on the input information is directly printed and recorded.

FIG. 20C shows a print medium inserted with redundant blocks and having code pattern image non-recording regions, which is formed in accordance with the flow charts shown in FIGS. 18 and 19, under the same conditions as above. In this medium, the divided code pattern image portions have redundant blocks, and divisionally printed code pattern image portions have nearly equal print recording lengths. In this case, the value R is changed from 10 to 8.

The method of inserting redundant blocks is not limited to the above-mentioned one. For example, as shown in FIG. 20D, many redundant blocks may be inserted to cope with read errors more efficiently.

As shown in FIG. 20E, dummy data blocks which are insignificant as information although they are a kind of redundant blocks may be inserted, so that the divisionally printed code pattern image portions have nearly equal print recording lengths.

In this way, when redundant data are added to set nearly equal print recording lengths of divided code pattern image portions, a print medium which is always divided with good balance can be obtained independently of the actually input information volume.

According to the flow charts shown in FIGS. 18 and 19, an insertion mode that inserts code pattern image non-recording regions and a non-insertion mode that does not insert any non-recording regions can be selectively used. In addition, when the continuous print recording length based on the input information is larger than the print recording length of the code pattern image set by a print recording length setting means, the insertion mode is automatically selected. On the other hand, when the continuous print recording length based on the input information is smaller than the print recording length of the code pattern image set by a print recording length setting means, the non-insertion mode is automatically selected. Hence, the user can devote himself or herself to information input without switching the modes by himself or herself.

In the present invention, in order to set substantially equal print recording lengths of code pattern image portions to be divisionally printed, another means may be used upon setting m in step S1815 in the flow chart in FIG. 18.

More specifically, m is changed not to exceed itself so that the value obtained by dividing P by n (the maximum number of printable blocks in the widthwise direction of the print medium) becomes an integer multiple of m, thus obtaining an integer value m'. The value m' represents the number of blocks to be recorded within the set print recording length of each divided code pattern image.

This process will be explained with reference to FIGS. 21A to 21C. FIG. 21A shows a print medium obtained when only code pattern image non-recording regions are inserted under the conditions shown in FIG. 21B, and a code pattern image based on the input information is directly printed and recorded.

FIG. 21C shows a print medium having code pattern non-recording regions when the integer value m'=4. In this medium, redundant blocks are inserted at block addresses 17 and 18. Consequently, when m is set in this way, the non-recording region length can be easily adjusted without arranging a dedicated code pattern image non-recording region length setting means.

Depending on the setting method of m, the print recording lengths of code pattern portions to be divisionally printed can be set to be nearly equal to each other without inserting any redundant blocks. More specifically, when the maximum value P=24 and m=5 in FIG. 18, if the integer value m' is set at 4, the print recording lengths of code pattern portions to be divisionally printed can be set to be nearly equal to each other even when each divided code pattern image portion has no redundant blocks, and a print medium which is divided with good balance as a whole can be obtained.

Figure 22:
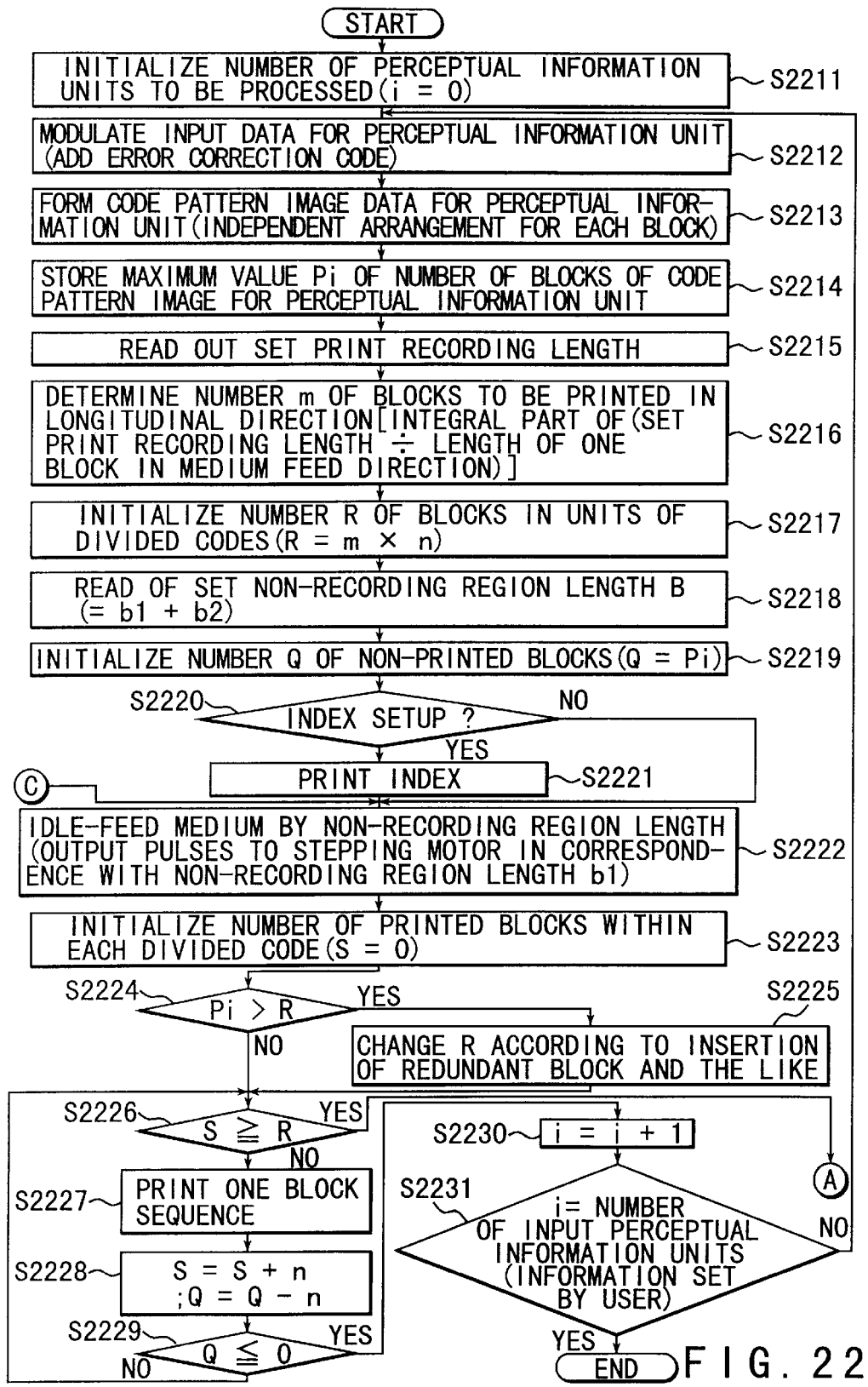
FIG. 22 is a flow chart showing still another processing of the flow charts shown in FIGS. 18 and 19.
Figure 23:
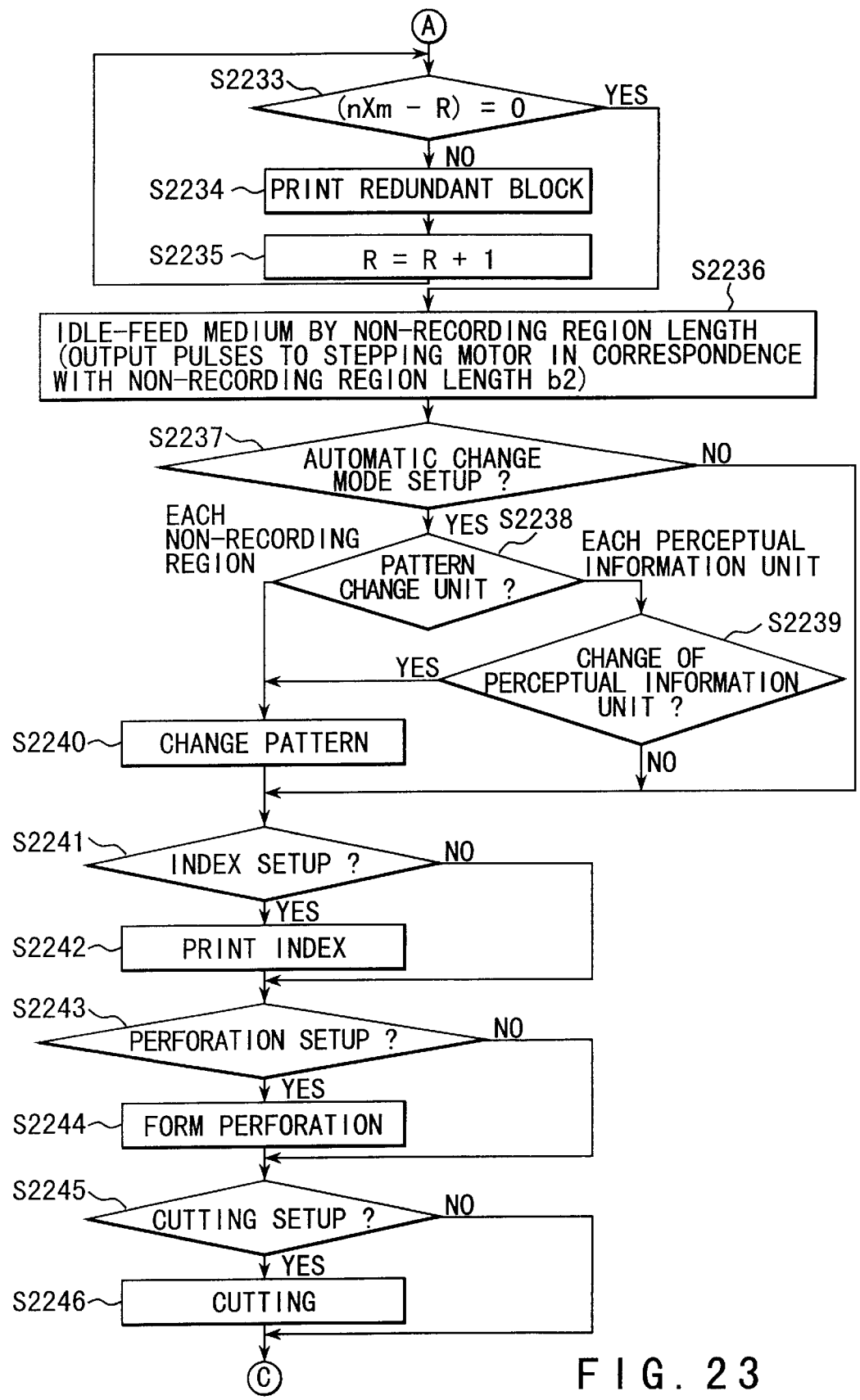
FIG. 23 is a flow chart which follows the flow chart in FIG. 22.

FIGS. 22 and 23 are flow charts for explaining encoding and printing different from those shown in FIGS. 18 and 19.

The flow charts shown in FIGS. 22 and 23 are basically the same as those shown in FIGS. 18 and 19, except that a code pattern image can be printed on the basis of a plurality of pieces of perceptual information.

The number of perceptual information units to be processed is initialized (i=0) (step S2211), and input data is modulated (step S2212). Subsequently, code pattern image data is formed in units of perceptual information (step S2213). A maximum value Pi of the number of blocks of that code pattern image is stored (step S2214), and the already set print recording length of the code pattern image is read out (step S2215), thus determining the number m of blocks to be printed in the feed direction of the print medium (step S2216). The number m of blocks to be printed is multiplied by the maximum number n of printable blocks in the widthwise direction of the print medium, which has already been detected, so as to initialize the value R of the number of blocks of a code pattern image portion to be divisionally printed (the number of blocks in units of divided codes) (step S2217). Subsequently, the already set code pattern image non-recording region length B (=b1+b2) is read out (step S2218), and the number Q (Q=Pi) of non-printed blocks is initialized (step S2219). If printing of a predetermined index has been set, the index is printed on an empty region at the beginning of the print medium (steps S2220 and S2221). After printing, in order to insert a code pattern image non-recording region, the print medium is idle-fed (the motor driver 29 outputs pulses required for feeding the print medium by a distance corresponding to the code pattern image non-recording region length b1 to the stepping motor as the medium feeder 50 so as to idle feed the medium) (step S2222). The number of printed blocks within a divided code unit is initialized (S=0) (step S2223). In this case, after the predetermined index is printed, the print medium is idle-fed by the distance corresponding to the code pattern image non-recording region length b1. However, strictly speaking, the print medium is idle-fed by a distance obtained by subtracting the medium feed amount upon printing the index from b1.

Subsequently, the number of blocks in units of divided codes is compared with the maximum value Pi of the number of blocks. If R is larger than Pi, i.e., if the continuous print recording length of the code pattern image based on one input perceptual information is larger than the set print recording length (step S2224), the flow advances to step S2225, and the value R is decreased to insert redundant blocks in the feed direction of the print medium (in this case, the maximum number of blocks that can be recorded within the set print recording length remains the same). On the other hand, if Pi is equal to or smaller than R, i.e., the continuous print recording length of the code pattern image based on one input perceptual information is shorter than (or equal to) the set print recording length, the flow directly advances to step S2226.

S initialized in step S1822 is compared with the changed number R of blocks in units of divided codes (step S2225). If S is less than R, the flow advances to step S2227 to print one block sequence (n blocks). A counter S for the number of printed blocks within the set print recording length is incremented by n, and a counter Q for the number of non-printed blocks of all the blocks to be printed is decremented by n (step S2228). It is then checked if all the blocks of the code pattern image based on the currently input one perceptual information have been printed, i.e., $Q \leq 0$ (if the initial value of Q is not an integer multiple of n, it assumes a negative value after all the blocks have been printed) (step S2229). If all the blocks have not been printed yet, the flow returns to step S2226; otherwise, the flow advances to step S2230. In step S2230, i is incremented by 1, and it is checked if the incremented value i has reached the number of perceptual information units set in advance by the user (step S2231). If YES in step S2231, the processing ends; otherwise, the flow returns to step S2212.

On the other hand, if it is determined in step S2226 that S is equal to or larger than R, the flow advances to step S2233 to insert redundant blocks, and a redundant block is printed (step S2234) and R is incremented (step S2235) until (n×m−R)=0 holds. If all the blocks including redundant blocks have been printed within the set print recording length, the print medium is idle-fed (the motor driver 29 outputs pulses required for feeding the print medium by a distance corresponding to the code pattern image non-recording region length b2 to the stepping motor as the medium feeder 50 so as to idle-feed the medium) (step S2236).

Finally, if the automatic change mode that changes various patterns in units of code pattern image non-recording regions or in correspondence with perceptual information units has been set (step S2237), the unit of the pattern change is determined (step S2238). If the unit is a code pattern image non-recording region, patterns are changed (step S2240); if the unit is a perceptual information unit, change in perceptual information unit is detected and the patterns are similarly changed if a change has been detected (step S2240). If no change is detected, the flow advances to step S2241. Also, if it is determined in step S2237 that the automatic change mode is not set, the flow similarly advances to step S2241.

In step S2241, printing of an index, formation of perforations, and cutting of the print medium are done in accordance with index, perforation, and medium cutting setups (steps S2241 to S2246). The flow then returns to step S2222.

The above-mentioned processing is similarly repeated, and if it is determined in step S2231 that all the pieces of perceptual information have been printed as a code pattern image, a series of operations end.

Examples of index, perforation, and medium cutting patterns for a print medium having code pattern image non-recording regions, which is printed by the code pattern image recording apparatus described above in detail will be explained below in addition to the contents described above with the aid of FIGS. 7 to 14.

FIG. 24A shows a case wherein the above-mentioned index is changed in correspondence with perceptual information units. In this case, code pattern images of different perceptual information units can be easily identified upon pasting onto a sheet surface after the print medium is cut into pieces. It is more preferable that a plurality of divided code pattern image portions that make up a single perceptual information unit be set to have an identical index pattern, as shown in FIG. 24A. With this arrangement, code pattern images of different perceptual information units can be perfectly prevented from being erroneously edited upon pasting after the print medium is cut into pieces, and reproduction errors due to read errors in later processes can be reliably avoided. As shown in FIG. 24A, each index may be printed on the upper portion side on the print medium to also indicate the top and bottom of the code pattern image. With this arrangement, the present invention can also be applied to a code pattern image with a format which has limitation conditions in the top and bottom in the read direction.

This index can be changed in units of code pattern image non-recording regions. In this case, since the continuity and order of information after the print medium is cut can be determined on the basis of the index patterns, the read order of code pattern images by the reader can be easily identified upon pasting onto a sheet surface, and the present invention can also be applied to a code pattern image with a format having limitation conditions in the read order.

As can be seen from the above description, as a preferred aspect of an index, as shown in FIG. 24B, indices 0-0, 0-1, 0-2, 1-0, 1-1, and 1-2 are printed and recorded on the upper left portions of divided code pattern image portions so as to indicate the perceptual information units, read order, and top and bottom at the same time.

As for the cutting patterns shown in FIGS. 9 to 13B, the above-mentioned various cutting patterns can be changed in correspondence with perceptual information units. In this case, code pattern images of different perceptual information units can be easily identified upon pasting onto a paper sheet after the print medium is cut into pieces. A plurality of divided code pattern image portions that make up a single perceptual information unit are preferably set to have an identical cutting pattern, as shown in FIG. 24C. With this arrangement, code pattern images of different perceptual information units can be perfectly prevented from being erroneously edited upon pasting after the print medium is cut into pieces, and reproduction errors due to read errors in later processes can be reliably avoided.

Furthermore, the cutting pattern can be changed in units of code pattern image non-recording regions. In this case, since the continuity and order of information after the print medium is cut can be determined on the basis of the cutting patterns, the read order of code pattern images by the reader can be easily identified upon pasting onto a sheet surface, and the present invention can also be applied to a code pattern image with a format having limitation conditions in the read order.

Moreover, the perforation formation pattern shown in FIG. 14 can also be changed in correspondence with perceptual information units. In this case, code pattern images of different perceptual information units can be easily identified upon pasting onto a paper sheet after the print medium is cut into pieces. It is more preferable that a plurality of divided code pattern image portions that make up a single perceptual information unit be set to have an identical formation pattern, as shown in FIG. 24D. With this arrangement, code pattern images of different perceptual information units can be perfectly prevented from being erroneously edited upon pasting after the print medium is cut into pieces at the positions of perforations, and reproduction errors due to read errors in later processes can be reliably avoided.

Also, the formation pattern can be changed in units of code pattern image non-recording regions. In this case, since the continuity and order of information after the print medium is cut can be determined on the basis of the formation patterns, the read order of code pattern images by the reader can be easily identified upon pasting onto a sheet surface, and the present invention can also be applied to a code pattern image with a format having limitation conditions in the read order.

The embodiments of the present invention have been described. However, the present invention is not limited to such specific embodiments, and various changes and modifications may be made within the spirit and scope of the invention.

Note that the embodiments of the present invention include the following inventions.

(1) A code pattern image recording apparatus which comprises:
information input means for inputting at least one of audio information, video information, and digital code data;
code pattern image conversion means for converting the information input by the information input means into a code pattern image according to a predetermined format; and
recording means for continuously and optically readably printing and recording the code pattern image converted by the code pattern image conversion means on a print medium, which is sequentially fed in a predetermined direction, along the feed direction,
the apparatus is characterized by further comprising:
non-recording region insertion means for inserting a code pattern image non-recording region in units of predetermined print recording lengths of the continuously recorded code pattern image along the feed direction of the print medium, with the code pattern image being printed and recorded while being divided into a plurality of code pattern image portions, and
in that the information input by the information input means is divisionally included in the divisionally recorded code pattern image portions.

With this arrangement, upon continuously printing and recording an optically readable code pattern image obtained by processing information such as input audio information or the like on a print medium, which is sequentially fed in a predetermined direction, along the feed direction, since code pattern image non-recording regions are inserted in units of predetermined print recording lengths of the code pattern image, the layout and edit processes of the printed code pattern image on another sheet surface can be easily performed without being limited by the size of that sheet surface or the like.

More specifically, even when the print medium is cut and separated or folded at the positions of the code pattern image non-recording regions, the printed code pattern image can be prevented from being inadvertently damaged, and reading in later processes can be prevented from being disturbed.

(2) A code pattern image recording apparatus which comprises:
information input means for inputting at least one of audio information, video information, and digital code data;
code pattern image conversion means for converting the information input by the information input means into a code pattern image according to a predetermined format; and
recording means for continuously and optically readably printing and recording the code pattern image converted by the code pattern image conversion means on a print medium, which is sequentially fed in a predetermined direction, along the feed direction,
the apparatus is characterized by further comprising:
width information detection means for detecting information pertaining to a length of the print medium used in a widthwise direction perpendicular to the feed direction; and
code pattern image setting means for setting an arrangement of the code pattern image to be recorded on the basis of the information detected by the width information detection means.

With this arrangement, the arrangement of the code pattern image to be printed can be appropriately set on the basis of information associated with the width of the print medium used, i.e., in correspondence with the width of the medium used independently of the types of medium.

(3) The code pattern image recording apparatus of (1) is characterized by further comprising print recording length setting means for setting the print recording length of the code pattern image.

With this arrangement, since the print recording length of the code pattern image can be desirably changed and set according to user's will, the code pattern image can be easily laid out on sheet surfaces with various sizes or shapes.

(4) The code pattern image recording apparatus of (3) is characterized by further comprising:
a data memory for temporarily storing data pertaining to the audio information input by the information input means;
information reproduction means for reproducing and outputting original audio information by processing the data stored in the data memory; and tone volume control amount input means for controlling a reproduction tone volume when the audio information is reproduced and output by the information reproduction means, and in that the print recording length setting means sets the print recording length on the basis of a manipulation amount of the tone volume control amount input means operated at a timing other than when the audio information is reproduced and output by the information reproduction means.

With this arrangement, since the number of operation switches used for setting the print recording length can be reduced, and delicate length adjustment can be attained as a numerical value can be continuously set, the degree of freedom in layout can be further increased accordingly. Also, because operation portions associated with functions that require continuous adjustment for, e.g., the tone volume and recording length are integrated, the user can perform simple operations without being confused.

(5) The code pattern image recording apparatus of (1) is characterized by further comprising non-recording region length setting means for setting a code pattern image non-recording region length.

With this arrangement, since the code pattern image non-recording region length can be desirably changed and set according to user's will, the code pattern image is unlikely to be damaged by cutting, and a print medium cutting means is free from any constraints. Also, uneconomic consumption of the print medium due to insertion of code pattern image non-recording regions with excessive lengths can be prevented, thus attaining resource savings.

(6) The code pattern image recording apparatus of (5) is characterized by further comprising:

a data memory for temporarily storing data pertaining to the audio information input by the information input means;

information reproduction means for reproducing and outputting original audio information by processing the data stored in the data memory; and tone volume control amount input means for controlling a reproduction tone volume when the audio information is reproduced and output by the information reproduction means, and in that the non-recording region length setting means sets the code pattern image non-recording region length on the basis of a manipulation amount of the tone volume control amount input means operated at a timing other than reproduction of the audio information by the information reproduction means.

With this arrangement, since the number of operation switches used for setting the print recording length can be reduced, and delicate length adjustment can be attained since a numerical value can be continuously set, the degree of freedom in layout can be further increased accordingly. Also, as operation portions associated with functions that require continuous adjustment for, e.g., the tone volume and recording length are integrated, the user can perform simple operations without being confused.

(7) The code pattern image recording apparatus of (1) is characterized by further comprising mode switching means for selectively switching an insertion mode that inserts the code pattern image non-recording region, and a non-insertion mode that does not insert any non-recording region.

With this arrangement, since the insertion mode that inserts code pattern image non-recording regions and the non-insertion mode that does not insert any non-recording regions can be selectively used, the user can desirably select such modes in correspondence with the conditions and the like of the layout target of the code pattern image, thus allowing a variety of use according to purposes. Also, when the layout of the code pattern image has a length much larger than the continuous print recording length of that code pattern image, uneconomical medium consumption due to insertion of code pattern image non-recording regions can be avoided, thus attaining resource savings.

(8) The code pattern image recording apparatus of (7) is characterized by further comprising:

print recording length setting means for setting the print recording length of the code pattern image, and in that the mode switching means sets the insertion mode when a continuous print recording length of the code pattern image based on the input information is larger than the print recording length of the code pattern image set by the print recording length setting means, and sets the non-insertion mode when the continuous print recording length of the code pattern image based on the input information is smaller than the print recording length of the code pattern image set by the print recording length setting means.

With this arrangement, whether or not code pattern image non-recording regions are inserted can be selected by comparing the print recording length of a code pattern image set in advance by the user, and the continuous print recording length of that code pattern image based on the actually input information without insertion of any code pattern image non-recording regions. Hence, appropriate print medium outputs according to situations can always be obtained. In addition, uneconomical medium consumption due to insertion of code pattern image non-recording regions can also be avoided, thus attaining resource savings.

(9) The code pattern image recording apparatus of (1) is characterized in that the code pattern image conversion means comprises means for converting the information with the divisionally recorded code pattern image portions having substantially equal print recording lengths along the feed direction of the print medium.

With this arrangement, since the divisionally printed code pattern image portions have nearly equal print recording lengths, a print medium which is divided with good balance as a whole can be obtained.

(10) The code pattern image recording apparatus of (1) is characterized in that the code pattern image conversion means comprises means for adding redundant data with the divisionally recorded code pattern image portions having substantially equal print recording lengths along the feed direction of the print medium.

With this arrangement, since redundant data are added so that the divisionally printed code pattern image portions have nearly equal print recording lengths, a print medium which is divided with good balance as a whole can always be obtained independently of the actually input information volume.

(11) The code pattern image recording apparatus of (1) is characterized by further comprising index recording means for printing and recording a predetermined index in the code pattern image non-recording region.

With this arrangement, since code pattern image non-recording regions and indices can be inserted and printed on a series of divided code pattern image portions, the user can easily cut the obtained print medium with, e.g., scissors using such indices as yardsticks.

(12) The code pattern image recording apparatus of (11) is characterized in that the index recording means prints and records an index indicating top and bottom of the code pattern image in the code pattern image non-recording region.

With this arrangement, the present invention can be applied to a code pattern image with a format that has limitation conditions in the vertical direction upon reading.

(13) The code pattern image recording apparatus of (11) is characterized in that the index recording means includes means for changing a print pattern of the index for each perceptual information unit of the input information.

With this arrangement, since the print pattern of the index is changed in correspondence with perceptual information units, the sets and kinds of audio information, video information, and the like can be easily identified from such index. As a result, even when the user accidentally mixes code pattern images based on different perceptual information units, he or she can easily identify them.

(14) The code pattern image recording apparatus of (11) is characterized in that the index recording means includes means for changing a print pattern of the index for each perceptual information unit of the input information, and setting an identical print pattern of the index among a plurality of divided code pattern image portions that make up the one perceptual information unit.

With this arrangement, edit errors among different perceptual information units can be perfectly removed upon pasting after the print medium is cut into pieces, and reproduction errors due to read errors in later processes can be reliably prevented.

(15) The code pattern image recording apparatus of (11) is characterized in that the index recording means includes means for changing a print pattern of the index for each code pattern image non-recording region.

With this arrangement, since the print pattern of the index is changed in units of code pattern image non-recording regions, the continuity and order can be determined based on the print patterns after the print medium is cut into pieces. Consequently, the read order of code image patterns by a reader can be easily identified upon pasting onto a sheet surface, and the present invention can be applied to a code pattern image with a format that has limitation conditions on the read order.

(16) The code pattern image recording apparatus of (1) is characterized by further comprising cutting indicator formation means for forming an indicator used for cutting the print medium in the code pattern image non-recording region.

With this arrangement, since code pattern image non-recording regions and cutting indicators are inserted and formed, the user can easily cut the print medium into pieces. Also, because the user can easily fold the print medium at the positions of the code pattern image non-recording regions along the cutting indicators, the print medium can be stored compact without cutting a code pattern image sequence.

(17) The code pattern image recording apparatus of (16) is characterized in that the cutting indicator formation means includes means for changing a formation pattern of the indicator for each perceptual information unit of the input information.

With this arrangement, since the formation pattern of the indicator is changed in correspondence with perceptual information units, the sets and kinds of audio information, video information, and the like can be easily identified from such indicator. As a result, even when the user accidentally mixes code pattern images based on different perceptual information units, he or she can easily identify them.

(18) The code pattern image recording apparatus of (16) is characterized in that the cutting indicator formation means includes means for changing a formation pattern of the indicator for each perceptual information unit of the input information, and setting an identical formation pattern of the indicator among a plurality of divided code pattern portions that make up the one perceptual information unit.

With this arrangement, edit errors among different perceptual information units can be perfectly removed upon pasting after the print medium is cut into pieces, and reproduction errors due to read errors in later processes can be reliably prevented.

(19) The code pattern image recording apparatus of (16) is characterized in that the cutting indicator formation means includes means for changing a formation pattern of the indicator for each code pattern image non-recording region.

With this arrangement, since the formation pattern is changed in units of code pattern image non-recording regions, the continuity and order can be determined based on the formation patterns after the print medium is cut into pieces. Consequently, the read order of code image patterns by a reader can be easily identified upon pasting onto a sheet surface, and the present invention can be applied to a code pattern image with a format that has limitation conditions on the read order.

(20) The code pattern image recording apparatus of (16), (17), (18), or (19) is characterized in that the cutting indicator is formed by perforations.

With this arrangement, since the cutting indicator is formed by perforations, the user can cut the print medium into pieces without using any tools such as scissors. Also, since the user can easily fold the print medium along the perforations, the print medium can be stored compact without cutting a code pattern image sequence.

(21) The code pattern image recording apparatus of (1) is characterized by further comprising cutting means for cutting and dividing the print medium in the code pattern image non-recording region.

With this arrangement, since the print medium can be cut and divided at the positions of code pattern image non-recording regions without damaging the code pattern image, layout and paste processes of the code pattern image onto a sheet surface can be easily done without being limited by the size, shape, and the like of the sheet surface as the layout target, thus allowing efficient layout and edit processes of the code pattern image.

(22) The code pattern image recording apparatus of (21) is characterized in that the cutting means includes means for changing a cutting pattern for each perceptual information unit of the input information.

With this arrangement, since the cutting pattern of the cutting means is changed in correspondence with perceptual information units, the sets and kinds of audio information, video information, and the like can be easily identified from such cutting pattern. As a result, even when the user accidentally mixes code pattern images based on different perceptual information units, he or she can easily identify them.

(23) The code pattern image recording apparatus of (21) is characterized in that the cutting means includes means for changing a cutting pattern for each perceptual information unit of the input information, and setting an identical cutting pattern among a plurality of divided code pattern portions that make up the one perceptual information unit.

With this arrangement, edit errors among different perceptual information units can be perfectly removed upon pasting after the print medium is cut into pieces, and reproduction errors due to read errors in later processes can be reliably prevented.

(24) The code pattern image recording apparatus of (21) is characterized in that the cutting means includes means for changing a cutting pattern for each code pattern image non-recording region.

With this arrangement, since the cutting pattern of the cutting means is changed in units of code pattern image non-recording regions, the continuity and order can be determined based on the cutting patterns after the print medium is cut into pieces. Consequently, the read order of code image patterns by a reader can be easily identified upon pasting onto a sheet surface, and the present invention can be applied to a code pattern image with a format that has limitation conditions on the read order.

(25) The code pattern image recording apparatus of (1), (3), or (4) is characterized in that the code pattern image is formed by arranging a plurality of blocks each of which can hold divided data obtained by dividing data pertaining to the information input by the information input means in units of predetermined volumes, and has a predetermined area, each of the blocks is made up of at leas t a data dot pattern consisting of a plurality of dots arranged in correspondence with the divided data, markers which are arranged to have a predetermined positional relationship with the data dot pattern and are used for determining a reading reference position of the data dot pattern, and a block address pattern which represents a position of that block in the code pattern image, and the print recording length is defined using one of the blocks as a minimum adjustment unit.

With this arrangement, since the shape or size of a code pattern image can be relatively easily changed or adjusted using a block as a minimum adjustment unit, it is very easy to divide a code pattern image into pieces, and to insert code pattern image non-recording regions between adjacent divided portions. Hence, such arrangement is very suitable for the code pattern image recording apparatus of the present invention.

(26) The code pattern image recording apparatus of (2) is characterized by further comprising:

mode switching means for selecting one of a medium use amount priority mode that gives priority to efficient use of the print medium, and a reading priority mode which gives priority to reading stability upon reading of the recorded code pattern image, and in that the code pattern image setting means sets the arrangement of the code pattern image to be recorded in accordance with the information detected by the width information detection means and the mode selected by the mode switching means.

With this arrangement, since the user can selectively use the medium use amount priority mode and the reading priority mode, and the arrangement of the code pattern image can be appropriately set on the basis of the selected mode and the width of the medium detected by the medium width detection means, the arrangement of the code pattern image that can reflect user's will can be easily set while considering the type of medium.

(27) The code pattern image recording apparatus of (2) is characterized in that the code pattern image is formed by arranging a plurality of blocks each of which can hold divided data obtained by dividing data pertaining to the information input by the information input means in units of predetermined volumes, and has a predetermined area, each of the blocks is made up of at least a data dot pattern consisting of a plurality of dots arranged in correspondence with the divided data, markers which are arranged to have a predetermined positional relationship with the data dot pattern and are used for determining a reading reference position of the data dot pattern, and a block address pattern which represents a position of that block in the code pattern image, and the code pattern image setting means sets the arrangement of the code pattern image by adjusting the number of blocks in the feed direction of the print medium and/or the number of blocks in the widthwise direction of the print medium using each of the blocks as a minimum adjustment unit.

With this arrangement, since the shape or size of a code pattern image can be relatively easily changed or adjusted using a block as a minimum adjustment unit, it is easy to set the arrangement of the code pattern image according to the medium width. Hence, such arrangement is very suitable for the code pattern image recording apparatus of the present invention.

As described in detail above, according to the present invention, a code recording apparatus which allows layout even when the length of a print medium that has recorded information exceeds that of an object on which the print medium is to be pasted or laid out, and allows printing corresponding to various medium widths can be provided.

Additional advantages and modifications will readily occur to those skilled in the art. Therefore, the invention in its broader aspects is not limited to the specific details, and representative devices shown and described herein. Accordingly, various modifications may be made without departing from the spirit and scope of the general inventive concept as defined by the appended claims and their equivalents.

What is claimed is:

1. A code pattern image recording apparatus comprising:
   information input means for inputting at least one of audio information, video information, and digital code data;
   code pattern image conversion means for converting the information input by said information input means into a code pattern image according to a predetermined format;
   recording means for continuously and optically readably printing and recording the code pattern image converted by said code pattern image conversion means on a print medium, which is sequentially fed in a predetermined direction, along the feed direction; and
   non-recording region insertion means for inserting a code pattern image non-recording region in units of predetermined print recording lengths of the continuously recorded code pattern image along the feed direction of the print medium, with the code pattern image being printed and recorded while being divided into a plurality of code pattern image portions,
   wherein the information input by said information input means is divisionally included in the divisionally recorded code pattern image portions.

2. A code pattern image recording apparatus comprising:
   information input means for inputting at least one of audio information, video information, and digital code data;
   code pattern image conversion means for converting the information input by said information input means into a code pattern image according to a predetermined format;
   recording means for continuously and optically readably printing and recording the code pattern image converted by said code pattern image conversion means on a print medium, which is sequentially fed in a predetermined direction, along the feed direction;
   width information detection means for detecting information pertaining to a length of the print medium used in a widthwise direction perpendicular to the feed direction; and code pattern image setting means for setting an arrangement of the code pattern image to be recorded on the basis of the information detected by said width information detection means.

3. An apparatus according to claim 1, further comprising print recording length setting means for setting the print recording length of the code pattern image.

4. An apparatus according to claim 3, further comprising:

a data memory for temporarily storing data pertaining to the audio information input by said information input means;

information reproduction means for reproducing and outputting original audio information by processing the data stored in said data memory; and tone volume control amount input means for controlling a reproduction tone volume when the audio information is reproduced and output by said information reproduction means, and wherein said print recording length setting means sets the print recording length on the basis of a manipulation amount of said tone volume control amount input means operated at a timing other than when the audio information is reproduced and output by said information reproduction means.

5. An apparatus according to claim 1, further comprising non-recording region length setting means for setting a code pattern image non-recording region length.

6. An apparatus according to claim 5, further comprising:

a data memory for temporarily storing data pertaining to the audio information input by said information input means;

information reproduction means for reproducing and outputting original audio information by processing the data stored in said data memory; and tone volume control amount input means for controlling a reproduction tone volume when the audio information is reproduced and output by said information reproduction means, and wherein said non-recording region length setting means sets the code pattern image non-recording region length on the basis of a manipulation amount of said tone volume control amount input means operated at a timing other than reproduction of the audio information by said information reproduction means.

7. An apparatus according to claim 1, further comprising mode switching means for selectively switching an insertion mode that inserts the code pattern image non-recording region, and a non-insertion mode that does not insert any non-recording region.

8. An apparatus according to claim 7, further comprising:

print recording length setting means for setting the print recording length of the code pattern image, and wherein said mode switching means sets the insertion mode when a continuous print recording length of the code pattern image based on the input information is larger than the print recording length of the code pattern image set by said print recording length setting means, and sets the non-insertion mode when the continuous print recording length of the code pattern image based on the input information is smaller than the print recording length of the code pattern image set by said print recording length setting means.

9. An apparatus according to claim 1, wherein said code pattern image conversion means comprises means for converting the information with the divisionally recorded code pattern image portions having substantially equal print recording lengths along the feed direction of the print medium.

10. An apparatus according to claim 1, wherein said code pattern image conversion means comprises means for adding redundant data with the divisionally recorded code pattern image portions having substantially equal print recording lengths along the feed direction of the print medium.

11. An apparatus according to claim 1, further comprising index recording means for printing and recording a predetermined index in the code pattern image non-recording region.

12. An apparatus according to claim 11, wherein said index recording means prints and records an index indicating top and bottom of the code pattern image in the code pattern image non-recording region.

13. An apparatus according to claim 11, wherein said index recording means includes means for changing a print pattern of the index for each perceptual information unit of the input information.

14. An apparatus according to claim 11, wherein said index recording means includes means for changing a print pattern of the index for each perceptual information unit of the input information, and setting an identical print pattern of the index among a plurality of divided code pattern image portions that make up the one perceptual information unit.

15. An apparatus according to claim 11, wherein said index recording means includes means for changing a print pattern of the index for each code pattern image non-recording region.

16. An apparatus according to claim 1, further comprising cutting indicator formation means for forming an indicator used for cutting the print medium in the code pattern image non-recording region.

17. An apparatus according to claim 16, wherein said cutting indicator formation means includes means for changing a formation pattern of the indicator for each perceptual information unit of the input information.

18. An apparatus according to claim 16, wherein said cutting indicator formation means includes means for changing a formation pattern of the indicator for each perceptual information unit of the input information, and setting an identical formation pattern of the indicator among a plurality of divided code pattern portions that make up the one perceptual information unit.

19. An apparatus according to claim 16, wherein said cutting indicator formation means includes means for changing a formation pattern of the indicator for each code pattern image non-recording region.

20. An apparatus according to claim 16, wherein the cutting indicator is formed by perforations.

21. An apparatus according to claim 17, wherein the cutting indicator is formed by perforations.

22. An apparatus according to claim 18, wherein the cutting indicator is formed by perforations.

23. An apparatus according to claim 19, wherein the cutting indicator is formed by perforations.

24. An apparatus according to claim 1, further comprising cutting means for cutting and dividing the print medium in the code pattern image non-recording region.

25. An apparatus according to claim 24, wherein said cutting means includes means for changing a cutting pattern for each perceptual information unit of the input information.

26. An apparatus according to claim 24, wherein said cutting means includes means for changing a cutting pattern for each perceptual information unit of the input information, and setting an identical cutting pattern among a plurality of divided code pattern portions that make up the one perceptual information unit.

27. An apparatus according to claim 24, wherein said cutting means includes means for changing a cutting pattern for each code pattern image non-recording region.

28. An apparatus according to claim 1, wherein the code pattern image is formed by arranging a plurality of blocks each of which can hold divided data obtained by dividing data pertaining to the information input by said information input means in units of predetermined volumes, and has a predetermined area, each of the blocks is made up of at least a data dot pattern consisting of a plurality of dots arranged in correspondence with the divided data, markers which are arranged to have a predetermined positional relationship with the data dot pattern and are used for determining a reading reference position of the data dot pattern, and a block address pattern which represents a position of that block in the code pattern image, and the print recording length is defined using one of the blocks as a minimum adjustment unit.

29. An apparatus according to claim 3, wherein the code pattern image is formed by arranging a plurality of blocks each of which can hold divided data obtained by dividing data pertaining to the information input by said information input means in units of predetermined volumes, and has a predetermined area, each of the blocks is made up of at least a data dot pattern consisting of a plurality of dots arranged in correspondence with the divided data, markers which are arranged to have a predetermined positional relationship with the data dot pattern and are used for determining a reading reference position of the data dot pattern, and a block address pattern which represents a position of that block in the code pattern image, and the print recording length is defined using one of the blocks as a minimum adjustment unit.

30. An apparatus according to claim 4, wherein the code pattern image is formed by arranging a plurality of blocks each of which can hold divided data obtained by dividing data pertaining to the information input by said information input means in units of predetermined volumes, and has a predetermined area, each of the blocks is made up of at least a data dot pattern consisting of a plurality of dots arranged in correspondence with the divided data, markers which are arranged to have a predetermined positional relationship with the data dot pattern and are used for determining a reading reference position of the data dot pattern, and a block address pattern which represents a position of that block in the code pattern image, and the print recording length is defined using one of the blocks as a minimum adjustment unit.

31. An apparatus according to claim 2, further comprising:

mode switching means for selecting one of a medium use amount priority mode that gives priority to efficient use of the print medium, and a reading priority mode which gives priority to reading stability upon reading of the recorded code pattern image, and wherein said code pattern image setting means sets the arrangement of the code pattern image to be recorded in accordance with the information detected by said width information detection means and the mode selected by said mode switching means.

32. An apparatus according to claim 2, wherein the code pattern image is formed by arranging a plurality of blocks each of which can hold divided data obtained by dividing data pertaining to the information input by said information input means in units of predetermined volumes, and has a predetermined area, each of the blocks is made up of at least a data dot pattern consisting of a plurality of dots arranged in correspondence with the divided data, markers which are arranged to have a predetermined positional relationship with the data dot pattern and are used for determining a reading reference position of the data dot pattern, and a block address pattern which represents a position of that block in the code pattern image, and said code pattern image setting means sets the arrangement of the code pattern image by adjusting the number of blocks in the feed direction of the print medium and/or the number of blocks in the widthwise direction of the print medium using each of the blocks as a minimum adjustment unit.

* * * * *